(12) United States Patent
Ugaji et al.

(10) Patent No.: US 7,094,500 B2
(45) Date of Patent: Aug. 22, 2006

(54) SECONDARY BATTERY

(75) Inventors: Masaya Ugaji, Neyagawa (JP); Kazuya Iwamoto, Sakai (JP); Shuji Ito, Nara (JP); Shinji Mino, Ibaraki (JP); Hiromu Matsuda, Hyogo (JP); Hiroshi Higuchi, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 421 days.

(21) Appl. No.: 10/333,288

(22) PCT Filed: Apr. 22, 2002

(86) PCT No.: PCT/JP02/04005

§ 371 (c)(1),
(2), (4) Date: Jan. 17, 2003

(87) PCT Pub. No.: WO02/089236

PCT Pub. Date: Nov. 7, 2002

(65) Prior Publication Data

US 2003/0175585 A1   Sep. 18, 2003

(30) Foreign Application Priority Data

Apr. 24, 2001   (JP) .............................. 2001-125477

(51) Int. Cl.
*H01M 6/14* (2006.01)
*H01M 4/58* (2006.01)
*H01M 8/10* (2006.01)

(52) U.S. Cl. ...................... 429/302; 429/231.9; 429/30

(58) Field of Classification Search ................ 429/302, 429/231.9, 231.95
See application file for complete search history.

(56) References Cited

U.S. PATENT DOCUMENTS

| 6,368,746 B1 * | 4/2002 | Takada et al. ............ 252/182.1 |
| 6,610,440 B1 * | 8/2003 | LaFollette et al. .......... 429/122 |
| 6,650,000 B1 * | 11/2003 | Ballantine et al. .......... 257/551 |
| 6,893,772 B1 * | 5/2005 | Howard ........................ 429/94 |
| 6,982,132 B1 * | 1/2006 | Goldner et al. ............. 429/162 |
| 2002/0037756 A1 * | 3/2002 | Jacobs et al. ................ 455/572 |
| 2002/0155335 A1 * | 10/2002 | Kearl .......................... 429/30 |

FOREIGN PATENT DOCUMENTS

| JP | 61-165965 A | 7/1986 |
| JP | 07-211320 A | 8/1995 |
| JP | 10-284130 A | 10/1998 |
| JP | 2001-015162 A | 1/2001 |
| JP | 2001-102056 A | 4/2001 |
| JP | 2001-210360 A | 8/2001 |

* cited by examiner

*Primary Examiner*—Patrick Joseph Ryan
*Assistant Examiner*—Ben Lewis
(74) *Attorney, Agent, or Firm*—Akin Gump Strauss Hauer & Feld, LLP

(57) ABSTRACT

A secondary battery comprising: a substrate; a first current collector; a first electrode; a solid electrolyte; a second electrode; and a second current collector; the first current collector being formed on the substrate and serving as a current collector of the first electrode, the first electrode being formed on the first current collector, the solid electrolyte being formed on the first electrode, the second electrode being formed on the solid electrolyte, the second current collector being formed on the second electrode and serving as a current collector of the second electrode, at least one electrode selected from the group consisting of the first electrode and the second electrode containing at least one material selected from the group consisting of an ion conductive material and an electron conductive material.

16 Claims, 9 Drawing Sheets

SECONDARY BATTERY

CROSS-REFERENCE TO RELATED APPLICATION

This application is a Section 371 of International Application No. PCT/JP02/4005, filed Apr. 22, 2002, the disclosure of which is incorporated herein by reference.

TECHNICAL FIELD

The present invention relates to secondary batteries, and particularly to an all solid-state thin film lithium secondary battery employing a solid electrolyte, and a method of producing the same.

BACKGROUND ART

With the recent development of portable appliances such as personal computers and cellular phones, there is a significant demand for batteries as the power sources for these appliances. Particularly, vigorous researches are being carried out in various fields on lithium secondary batteries as batteries capable of yielding a high energy density, because lithium is a substance having a low atomic weight and a high ionization energy.

On the other hand, since batteries used for these applications employ a liquid electrolyte, a problem such as the leakage of the electrolyte cannot be completely eliminated. In order to solve this problem and increase the reliability of the batteries, as well as realizing small and thin devices, attempts have been made in many fields to replace a liquid electrolyte with a solid electrolyte thereby to yield an all solid-state battery.

Particularly, in the case of the lithium secondary battery, there is a fear that the battery may heat up when the malfunction of the battery occurs because of its high energy density. Therefore, in order to ensure the battery safety, it is desired to develop an all solid-state lithium secondary battery employing a solid electrolyte comprising a nonflammable solid material. For example, lithium halide, lithium nitride, an oxyacid salt of lithium and derivatives thereof and the like are known as solid electrolytes for use in such battery.

Glassy solid electrolytes comprising a lithium ion conductive sulfide such as $Li_2S$—$SiS_2$, $Li_2S$—$P_2S_5$ or $Li_2S$—$B_2S_3$, are also known. Further, lithium ion conductive solid electrolytes, obtained by doping these glasses with lithium halide such as LiI, an oxyacid salt of lithium such as $Li_3PO_4$ or the like, are also known. Since these materials have a relatively high ion conductivity of $10^{-4}$ to $10^{-3}$ S/cm, studies have been focused on their physical properties.

For example, as described in Japanese Unexamined Patent Publication No. Hei 10-284130, an all solid-state thin film lithium secondary battery employing a solid electrolyte can be reduced in size and produced as a thin film, as well as being excellent in safety.

However, a secondary battery, particularly, an all solid-state thin film lithium secondary battery comprising a thin film electrode produced by a conventional thin film formation process, has an electrode thickness as small as 1 μm or less and therefore has a small battery capacity, so that it is not capable of providing a sufficient capacity required by appliances.

Additionally, increasing the thickness of the thin film electrode in an attempt to ensure the battery capacity does not also yield a sufficient charge/discharge characteristic required by the appliances. The reason is that, when the electrode thickness is increased, the charge/discharge characteristic decreases with an increase in the thickness.

For this reason, a secondary battery, particularly, an all solid-state thin film lithium secondary battery that is satisfactory in both the battery capacity and the charge/discharge characteristic, has not yet been produced.

DISCLOSURE OF INVENTION

An object of the present invention is to provide a secondary battery, particularly, an all solid-state thin film lithium secondary battery having a significantly increased battery capacity, by increasing the thickness of thin film electrode without impairing the charge/discharge characteristic.

In order to solve the foregoing problems, a secondary battery in accordance with the present invention comprises: a substrate; a first current collector; a first electrode; a solid electrolyte; a second electrode; and a second current collector;

the first current collector being formed on the substrate and serving as a current collector of the first electrode, the first electrode being formed on the first current collector, the solid electrolyte being formed on the first electrode, the second electrode being formed on the solid electrolyte, the second current collector being formed on the second electrode and serving as a current collector of the second electrode, at least one electrode selected from the group consisting of the first electrode and the second electrode containing at least one material selected from the group consisting of an ion conductive material and an electron conductive material.

More specifically, secondary batteries in accordance with the present invention include all of the following modes:

(i) A secondary battery in which the first electrode either contains an ion conductive material or electron conductive material, or contains both an ion conductive material and an electron conductive material, and the second electrode contains neither an ion conductive material nor an electron conductive material.

(ii) A secondary battery in which the second electrode either contains an ion conductive material or electron conductive material, or contains both an ion conductive material and an electron conductive material, and the first electrode neither contains an ion conductive material nor an electron conductive material.

(iii) A secondary battery in which the first electrode either contains an ion conductive material or electron conductive material, or contains both an ion conductive material and an electron conductive material, and the second electrode also either contains an ion conductive material or electron conductive material, or contains both an ion conductive material and an electron conductive material.

Herein, it is preferable that the volume percentage of the above-mentioned material in one electrode is not less than 5 vol % and not more than 50 vol %.

More specifically, when the first electrode contains only an ion conductive material, it is preferable that the first electrode contains the ion conductive material in not less than 5 vol % and not more than 50 vol %.

Alternatively, when the first electrode contains only an electron conductive material, it is preferable that the first electrode contains the electron conductive material in not less than 5 vol % and not more than 50 vol %.

Alternatively, when the first electrode contains both an ion conductive material and an electron conductive material, it is preferable that the total content of the ion conductive material and the electron conductive material in the first electrode is not less than 5 vol % and not more than 50 vol %.

Alternatively, when the second electrode contains only an ion conductive material, it is preferable that the second electrode contains the ion conductive material in not less than 5 vol % and not more than 50 vol %.

Alternatively, when the second electrode contains only an electron conductive material, it is preferable that the second electrode contains the electron conductive material in not less than 5 vol % and not more than 50 vol %.

Alternatively, when the second electrode contains both an ion conductive material and an electron conductive material, it is preferable that the total content of the ion conductive material and the electron conductive material in the second electrode is not less than 5 vol % and not more than 50 vol %.

It is preferable that at least one electrode has at least one groove formed along at least one of contact surfaces between the electrode and the current collector thereof and between the electrode and the solid electrolyte, and the at least one material is filled inside the groove.

More specifically, when the first electrode has at least one groove, the groove may be formed along the contact surface between the first electrode and the first current collector, or may be formed along the contact surface between the first electrode and the solid electrolyte.

Alternatively, when the second electrode has at least one groove, the groove may be formed along the contact surface between the second electrode and the second current collector, or may be formed along the contact surface between the second electrode and the solid electrolyte.

Alternatively, when the first electrode has at least one groove, the groove may cut through the first electrode in the thickness direction. In other words, the depth of the groove may be substantially the same as the thickness of the first electrode, and the groove may be formed along both the contact surfaces between the first electrode and the first current collector, and between the first electrode and the solid electrolyte.

Alternatively, when the second electrode has at least one groove, the groove may cut through the second electrode in the thickness direction. In other words, the depth of the groove may be substantially the same as the thickness of the second electrode, and the groove may be formed along both the contact surfaces between the second electrode and the second current collector, and between the second electrode and the solid electrolyte.

When at least one electrode contains at least an ion conductive material, it is preferable that the ion conductive material extends in the thickness direction of the electrode to form at least one ion conducting path connected with the solid electrolyte.

Further, when at least one electrode contains at least an electron conductive material, it is preferable that the electron conductive material extends in the thickness direction of the electrode to form at least one electron conducting path connected with the current collector thereof.

It is preferable that the amount of the ion conductive material forming the ion conducting path decreases from the solid electrolyte side toward the other side (i.e., the current collector side of the electrode having the ion conducting path).

It is preferable that the amount of the electron conductive material forming the electron conducting path decreases from the current collector side toward the other side (i.e., the solid electrolyte side).

A secondary battery in accordance with the present invention is preferably an all solid-state thin film lithium secondary battery. Further, it is possible to stack a plurality of all solid-state thin film lithium batteries and connect them in series or parallel.

The present invention also relates to a method of producing a secondary battery, comprising:

(1) a first step of forming a first current collector on a substrate;

(2) a second step of forming a first electrode on the first current collector;

(3) a third step of forming a solid electrolyte on the first electrode;

(4) a fourth step of forming a second electrode on the solid electrolyte; and (5) a fifth step of forming a second current collector on the second electrode, the first step through the fifth step each independently employing a chemical gas phase reaction process, a sputter process, an ion beam vapor deposition process, an electron beam vapor deposition process, a resistance heating vapor deposition process or a laser ablation process, at least the second step being a step of alternately or simultaneously depositing a first electrode material and an ion conductive material and/or electron conductive material on the first current collector, thereby forming the first electrode, or at least the fourth step being a step of alternately or simultaneously depositing a second electrode material and an ion conductive material and/or electron conductive material on the solid electrolyte, thereby forming the second electrode.

In the production method in accordance with the present invention, it is preferable that at least the second step comprises a step (2a) of depositing the first electrode material on the first current collector so as to form a groove and a subsequent step (2b) of filling, inside the groove, the ion conductive material and/or electron conductive material, or at least the fourth step comprises a step (4a) of depositing the second electrode material on the solid electrolyte so as to form a groove and a subsequent step (4b) of filling, inside of the groove, the ion conductive material and/or electron conductive material.

Herein, it is preferable that each of the step (2a) and the step (4a) is a step of forming a film comprising an electrode material by using a mask having a groove-shaped window, or a step of forming a film comprising an electrode material and then forming on the film, a resist pattern having a groove-shaped window by photolithography, followed by removing the film located at the window portion by dry etching or the like. However, a crack caused in the film during the formation of the film comprising an electrode material, may also be utilized as the groove.

In terms of forming an upper layer, it is desirable to further perform a step of planarizing the surface of the electrode, after the step (2b).

Additionally, in terms of forming an upper layer, it is desirable to further perform a step of planarizing the surface of the electrode, also after the step (4b).

The method of producing a secondary battery in accordance with the present invention is suitable for the production of an all solid-state thin film lithium secondary battery.

BEST MODE FOR CARRYING OUT THE INVENTION

Embodiment 1

Figure 1:
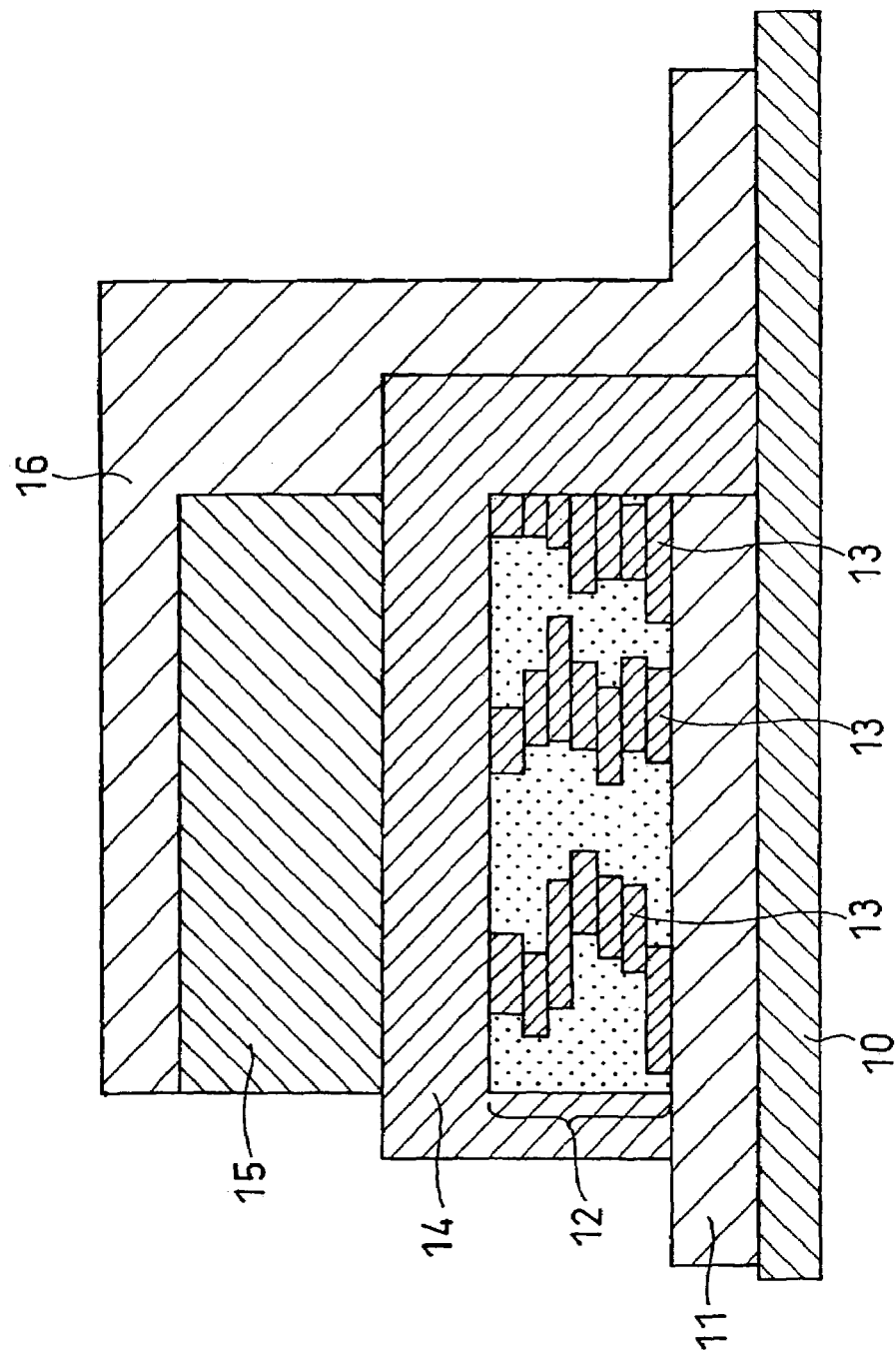
FIG. 1 is a vertical sectional view showing the configuration of a secondary battery of Embodiment 1 in accordance with the present invention.

In this embodiment, descriptions are made, by referring to FIG. 1, on a typical configuration of a secondary battery in accordance with the present invention.

As shown in FIG. 1, a secondary battery of the present invention comprises: a substrate 10; a first current collector 11; a first electrode 12; a solid electrolyte 14; a second electrode 15; and a second current collector 16.

The first current collector 11 serving as the current collector of the first electrode is formed on the substrate 10, the first electrode 12 is formed on the first current collector 11, and the solid electrolyte 14 is formed on the first electrode 12. The second electrode 15 is formed on the solid electrolyte 14, and the second current collector 16 serving as the current collector of the second electrode 15 is formed on the second electrode 15. For the purpose of protecting the battery from moisture in the air, it is also effective to form a resin, a laminated film comprising aluminum or the like on the second current collector 16.

In FIG. 1, the first electrode 12 contains at least one material 13 selected from the group consisting of an ion conductive material and an electron conductive material; however, this embodiment includes the case where the second electrode 15 contains the material 13, or where both the first electrode 12 and the second electrode 15 contains the material 13.

The battery shown in FIG. 1 may be formed by using a thin film formation process. More specifically, thin films are laminated from the bottom up on the substrate 10, in the order shown in FIG. 1.

Hereinafter, descriptions are made in principle for the case where the first electrode 12 is the positive electrode and the second electrode 15 is the negative electrode; however, this embodiment also includes the case where the first electrode is the negative electrode and the second electrode is the positive electrode.

As the substrate 10, an electrically insulating substrate comprising alumina, glass, polyimide film or the like, a semiconductor substrate comprising silicon or the like, an electrically conductive substrate comprising aluminum, copper or the like may be used, for example.

Herein, it is preferable that the substrate 10 has a low surface roughness and is mirror-finished.

As a first current collector 11, which is firstly formed on the substrate 10, an electron conductive material such as platinum, platinum/palladium, gold, silver, aluminum, copper, ITO (indium-tin oxide film), a carbon material or the like may be employed. Besides the above-mentioned materials, any material which has electron conductivity and does not react with the first electrode may also be used as the first current collector.

As the method of forming the first current collector 11, it is possible to employ a chemical gas phase reaction process, a sputter process, an ion beam vapor deposition process, an electron beam vapor deposition process, a resistance heating vapor deposition process, a laser ablation process or the like. However, when an electrically conductive material such as aluminum is used for the substrate 10, there may be a case where the first current collector is not necessary.

The thickness of the first current collector is preferably not less than 0.1 μm and not more than 1.0 μm. The same also applies to the case where the negative electrode is the first electrode.

For a positive electrode as the first electrode 12, any material used as a positive electrode material of a lithium secondary battery may be used without any limitation. Particularly, it is preferable to employ, for example, a transition metal oxide such as lithium cobaltate ($LiCoO_2$), lithium nickelate ($LiNiO_2$), lithium nickelate with cobalt incorporated therein ($LiCo_xNi_{1-x}O_2$), lithium manganate ($LiMn_2O_4$), vanadium oxide ($V_2O_5$) or molybdenum oxide ($MoO_2$), or titanium sulfide ($TiS_2$), each of which is currently used for a positive electrode of a lithium secondary battery.

As a method of producing this positive electrode, it is possible to employ a chemical gas phase reaction process, a sputter process, an ion beam vapor deposition process, an electron beam vapor deposition process, a resistance heating vapor deposition process, a laser ablation process or the like.

Since many of positive electrode materials have a low electron conductivity, when the thickness of the positive electrode is increased to 1 μm, 2 μm, etc., the resistance in the electrode increases, thereby adversely affecting the charge/discharge characteristic. Additionally, in the case of a lithium secondary battery employing an organic electrolyte, a problem concerning ion conductivity is usually avoided, because the electrode is porous and the organic electrolyte is impregnated in the electrode. However, when an electrode is not porous, the electrode has a low ion conductivity, so that the charge/discharge characteristic is further reduced.

Therefore, in order to increase the thickness of a positive electrode to ensure the battery capacity and achieve sufficient charge/discharge characteristic, it is effective to include in the positive electrode, at least one material 13 selected from the group consisting of an electron conductive material and an ion conductive material. This enables to suppress the reduction in electron conductivity and ion conductivity.

It should be noted that the thickness of the positive electrode is preferably not less than 0.1 µm and not more than 20 µm. The same also applies to the case where the positive electrode is the second electrode.

When the electron conductive material and/or ion conductive material 13 is included in the first electrode, a crack due to the expansion and contraction is difficult be caused in the electrode during charge/discharge, and furthermore, there is an advantage that a current collecting network can be secured even when a crack is caused in the electrode. Such effect of the electron conductive material and the ion conductive material is similarly obtained when the first electrode is the negative electrode, as with the case where the first electrode is the positive electrode.

It is preferable that the electron conductive material and ion conductive material that can be included in the first electrode are the same as the electron conductive material used for the first current collector and the ion conductive material used for the solid electrolyte 14, respectively; however, other electron conductive materials and ion conductive materials may also be employed.

In order to include an ion conductive material or an electron conductive material in an electrode as described above, the electrode is produced, for example, in the following manner by employing a chemical gas phase reaction process, a sputter process, an ion beam vapor deposition process, an electron beam vapor deposition process, a resistance heating vapor deposition process, a laser ablation process or the like.

Firstly, a target comprising an electrode material for producing an electrode and a target comprising an ion conductive material and/or electron conductive material, are prepared. These targets are placed in the same chamber. Then, the electrode material and the ion conductive material and/or electron conductive material are alternately or simultaneously deposited.

Herein, when the electrode material and the ion conductive material and/or electron conductive material are alternately deposited, the following operations, for example, are performed in sequence: the electrode material is deposited for a certain period of time, followed by stopping; the ion conductive material and/or electron conductive material is deposited for a certain period of time, followed by stopping; and the electrode material is deposited for a certain period of time, followed by stopping. These operations may be repeated any number of times.

It is desirable that the volume percentage of the ion conductive material and/or electron conductive material in the first electrode is not less than 5 vol % and not more than 50 vol %.

It is desirable that the ion conductive material in the first electrode is in contact with the solid electrolyte 14. Similarly, it is desirable that the electron conductive material in the first electrode is in contact with the first current collector.

It is preferable the amount of the ion conductive material in the first electrode decreases from the solid electrolyte 14 side toward the first current collector 11 side. Similarly, it is preferable that the amount of the electron conductive material in the first electrode decreases from the first current collector 11 side toward the solid electrolyte 14 side.

As a solid electrolyte 14, a material which has ion conductivity and has a negligibly low electron conductivity may be employed. Since lithium ions function as movable ions in a lithium secondary battery, it is desirable to use a solid electrolyte having an excellent lithium ion conductivity. For example, it is possible to employ lithium phosphate ($Li_3PO_4$), $LiPO_{4-x}N_x$ (LIPON) obtained by mixing $Li_3PO_4$ with nitrogen and glassy solid electrolytes comprising a lithium ion conductive sulfide such as $Li_2S$—$SiS_2$, $Li_2S$—$P_2S_5$ or $Li_2S$—$B_2S_3$. In addition, it is also possible to employ lithium ion conductive solid electrolytes obtained by doping each of these glassy solid electrolytes with lithium halide such as LiI, an oxyacid salt of lithium such as $Li_3PO_4$ or the like. These are materials having a high lithium ion conductivity, and are suitable to be applied to the present invention.

As a method of forming the solid electrolyte 14, it is possible to employ a chemical gas phase reaction process, a sputter process, an ion beam vapor deposition process, an electron beam vapor deposition process, a resistance heating vapor deposition process, a laser ablation process or the like.

It should be noted that the thickness of the solid electrolyte 14 is preferably not less than 0.1 µm and not more than 10 µm.

For a negative electrode as the second electrode 15, any material used as a negative electrode material of a lithium secondary battery may be employed without any limitation. Particularly, it is preferable to use a carbon material such as graphite or hard carbon, a tin alloy, a lithium cobalt nitride (LiCoN), a lithium metal, a lithium alloy (e.g., LiAl), lithium titanate ($Li_4Ti_3O_{12}$) and the like, each of which is currently used for a negative electrode of a lithium secondary battery.

As a method of forming the second electrode 15, it is possible to employ a chemical gas phase reaction process, a sputter process, an ion beam vapor deposition process, an electron beam vapor deposition process, a resistance heating vapor deposition process, a laser ablation process or the like. Additionally, it is possible to include an electron conductive material and/or ion conductive material also in the second electrode, in the same manner as in the case of the first electrode 12.

It should be noted that the thickness of the negative electrode is preferably not less than 0.1 µm and not more than 20 µm. The same applies to the case where the negative electrode is the first electrode.

As a second current collector 16, an electron conductive material such as platinum, platinum/palladium, gold, silver, aluminum, copper, ITO, carbon materials or the like may be employed, as in the case of the first current collector 11. Besides the above-mentioned materials, any material which has electron conductivity and does not react with the second electrode may also be employed as the second current collector.

In addition, as the method of forming the second current collector 16, it is possible to employ a chemical gas phase reaction process, a sputter process, an ion beam vapor deposition process, an electron beam vapor deposition process, a resistance heating vapor deposition process, a laser ablation process or the like, as with the case of the first current collector.

The thickness of the second current collector is preferably not less than 0.1 µm and not more than 1.0 µm. The same applies to the case where the positive electrode is the second electrode.

It is possible to stack a plurality of the above-described all solid-state thin film lithium secondary batteries.

Embodiment 2

Figure 2:
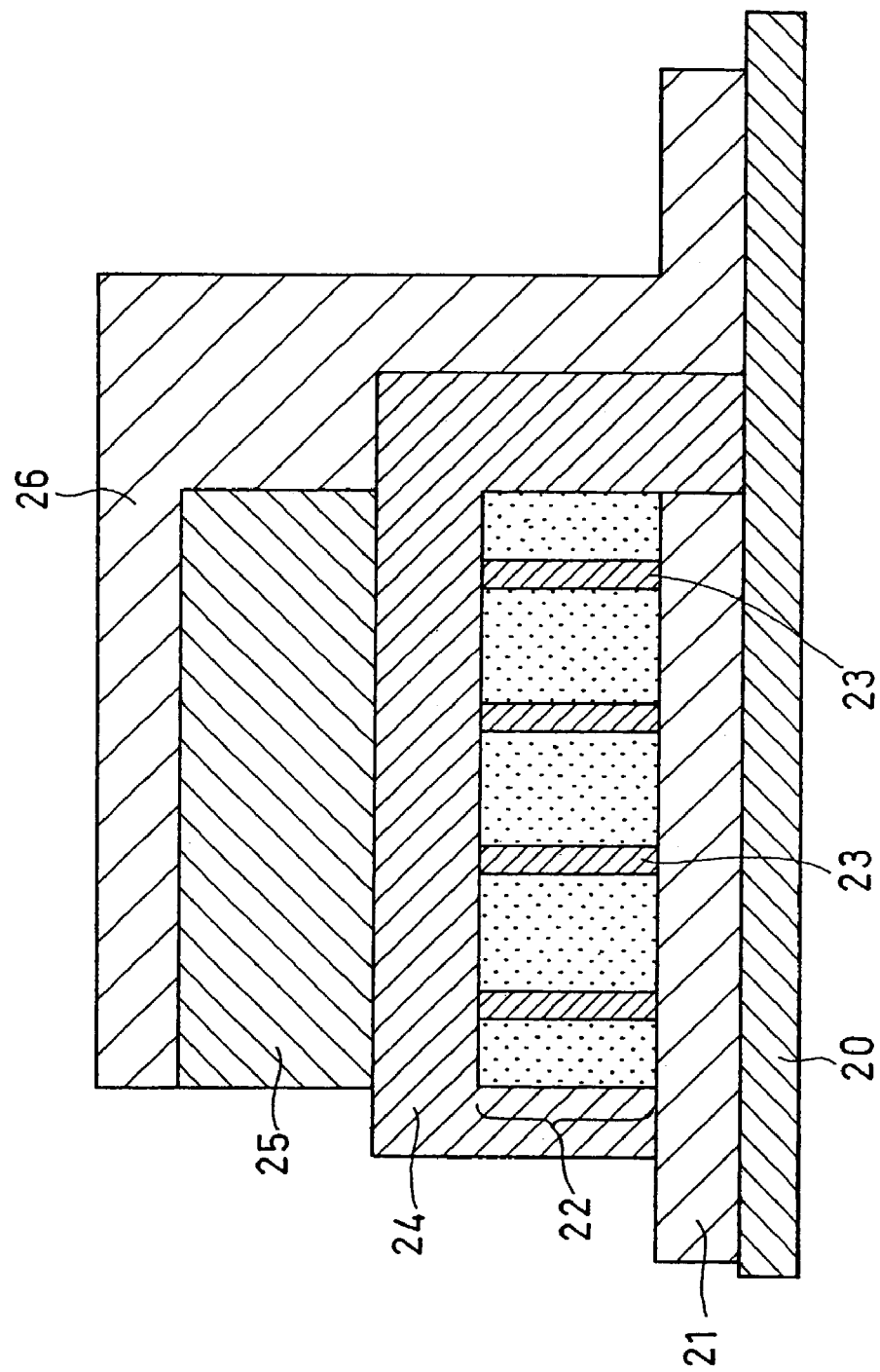
FIG. 2 is a vertical sectional view showing the configuration of a secondary battery of Embodiment 2 in accordance with the present invention.

In this embodiment, descriptions are made, by referring to FIG. 2, on a typical configuration of a secondary battery of the present invention, in which at least one electrode has at least one groove formed along at least one of contact surfaces between the electrode and the current collector thereof and between the electrode and a solid electrolyte, and at least one material selected from the group consisting of an ion conductive material and an electron conductive material is filled inside the groove.

The battery shown in FIG. 2 has the same configuration as that of the battery shown in FIG. 1 described in Embodiment 1, except that a first electrode 22 has grooves cutting through the first electrode 22 in the thickness direction, and at least one material 23 selected from the group consisting of an ion conductive material and an electron conductive material is filled inside the grooves.

More specifically, the secondary battery of this embodiment comprises: a substrate 20; a first current collector 21; a first electrode 22; a solid electrolyte 24; a second electrode 25; and a second current collector 26, and the first current collector 21 serving as the current collector of the first electrode is formed on the substrate 20, the first electrode 22 is formed on the first current collector 21, and the solid electrolyte 24 is formed on the first electrode 22. The second electrode 25 is formed on the solid electrolyte 24, and the second current collector 26 serving as the current collector of the second electrode 25 is formed on the second electrode 25.

In FIG. 2, the grooves formed on the first electrode 22 cut through the first electrode 22 in the thickness direction thereof; however, this embodiment includes the case where the grooves are formed along the contact surface between the first electrode and the first current collector or the contact surface between the first electrode and the solid electrolyte, and the grooves do not cut through the first electrode 22 in the thickness direction.

Additionally, in FIG. 2, the first electrode 22 contains at least one material 23 selected from the group consisting of an ion conductive material and an electron conductive material; however, this embodiment includes the case where the second electrode 25 contains the material 23, or where both the first electrode 22 and the second electrode 25 contains the material 23.

As shown in FIG. 2, when the ion conductive material and/or electron conductive material 23 is filled inside the grooves, the reduction in electron conductivity and ion conductivity is suppressed, so that the reaction proceeds rapidly.

The battery shown in FIG. 2 may be produced by the same thin film formation process as that used for the battery shown in FIG. 1, except that the formation method of the first electrode is different.

In order to produce the first electrode 22 on the first current collector 21 so as to form the grooves, it is possible to employ a mask sputtering, a photolithography technique, dry etching or the like. For example, the first electrode having the grooves may be produced by using a mask having a groove-shaped window to form a film comprising an electrode material. The first electrode having the grooves may also be produced by forming a film comprising an electrode material and having no groove and then forming a resist pattern having a groove-shaped window on the film by photolithography, followed by removing the film located at the window portion by dry etching or the like. Herein, cracks caused in the film during the formation of the film comprising an electrode material, may also be used as the grooves.

Subsequently, the ion conductive material and/or electron conductive material is filled inside the thus formed grooves. As the method of filling the electron conductive material and/or ion conductive material, it is possible to employ a chemical gas phase reaction process, a sputter process, an ion beam vapor deposition process, an electron beam vapor deposition process, a resistance heating vapor deposition process, a laser ablation process or the like.

The foregoing also applies to the case where the second electrode 25 contains at least one selected from the group consisting of an ion conductive material and an electron conductive material.

In addition, it is also possible to employ a method which involves forming on the first current collector, ribs each comprising an electron conductive material and having a shape corresponding to the groove by an etching process or masking, prior to the production of the first electrode, followed by depositing the first electrode material thereon. Additionally, when the second electrode 25 contains at least one selected from the group consisting of an ion conductive material and an electron conductive material, it is also possible to employ a method which involves forming on the solid electrolyte 24, ribs each comprising an ion conductive material and having a shape corresponding to the groove by an etching process or masking, prior to the production of the second electrode 25, followed by depositing the second electrode material thereon.

From the viewpoint of the battery characteristics, it is preferable to perform a planarization treatment on the surface of the first electrode 22, prior to the formation of the solid electrolyte 24 on the first electrode 22. As the planarization treatment on the electrode surface, it is effective to perform a resist etch back process, a planarization CMP (chemical mechanical polishing) process, which is ultra precision polishing, or the like. Similarly, it is preferable to perform a planarization treatment on the surface of the second electrode 25, prior to the formation of the second current collector 26 on the second electrode 25.

Electron conductive materials that can be included in the first electrode 22 and the second electrode 25 are preferably the same as the electron conductive material used for the first current collector 21 and that used for the second current collector 26, respectively; however, other electron conductive materials may also be employed.

Additionally, although each of ion conductive materials that can be included in the first electrode 22 and the second electrode 25 is preferably the same as the ion conductive material used for the solid electrolyte 24, other ion conductive materials may also be employed.

Herein, when the first electrode 22 contains at least an ion conductive material, it is preferable that the ion conductive material is in contact with the solid electrolyte 24. In addition, although not clearly shown from FIG. 2, it is also preferable that the amount of the ion conductive material decreases from the solid electrolyte 24 side toward the first current collector 21 side.

Similarly, when the first electrode 22 contains at least an electron conductive material, it is preferable that the electron conductive material is in contact with the first current collector 21. Although not clearly shown from FIG. 2, it is also preferable that the amount of the electron conductive material decreases from the first current collector 21 side toward the solid electrolyte 24 side.

When the second electrode 25 contains at least an ion conductive material, it is preferable that the ion conductive material is in contact with the solid electrolyte 24. It is also preferable that the amount of the ion conductive material decreases from the solid electrolyte 24 side toward the second current collector 26 side.

Similarly, when the second electrode 25 contains at least an electron conductive material, it is preferable that the electron conductive material is in contact with the second current collector 26. It is also preferable that the amount of the electron conductive material decreases from the second current collector 26 side toward the solid electrolyte 24 side.

It is possible to stack a plurality of all solid-state thin film lithium secondary batteries such as the above-described ones.

EXAMPLE 1

Figure 3:
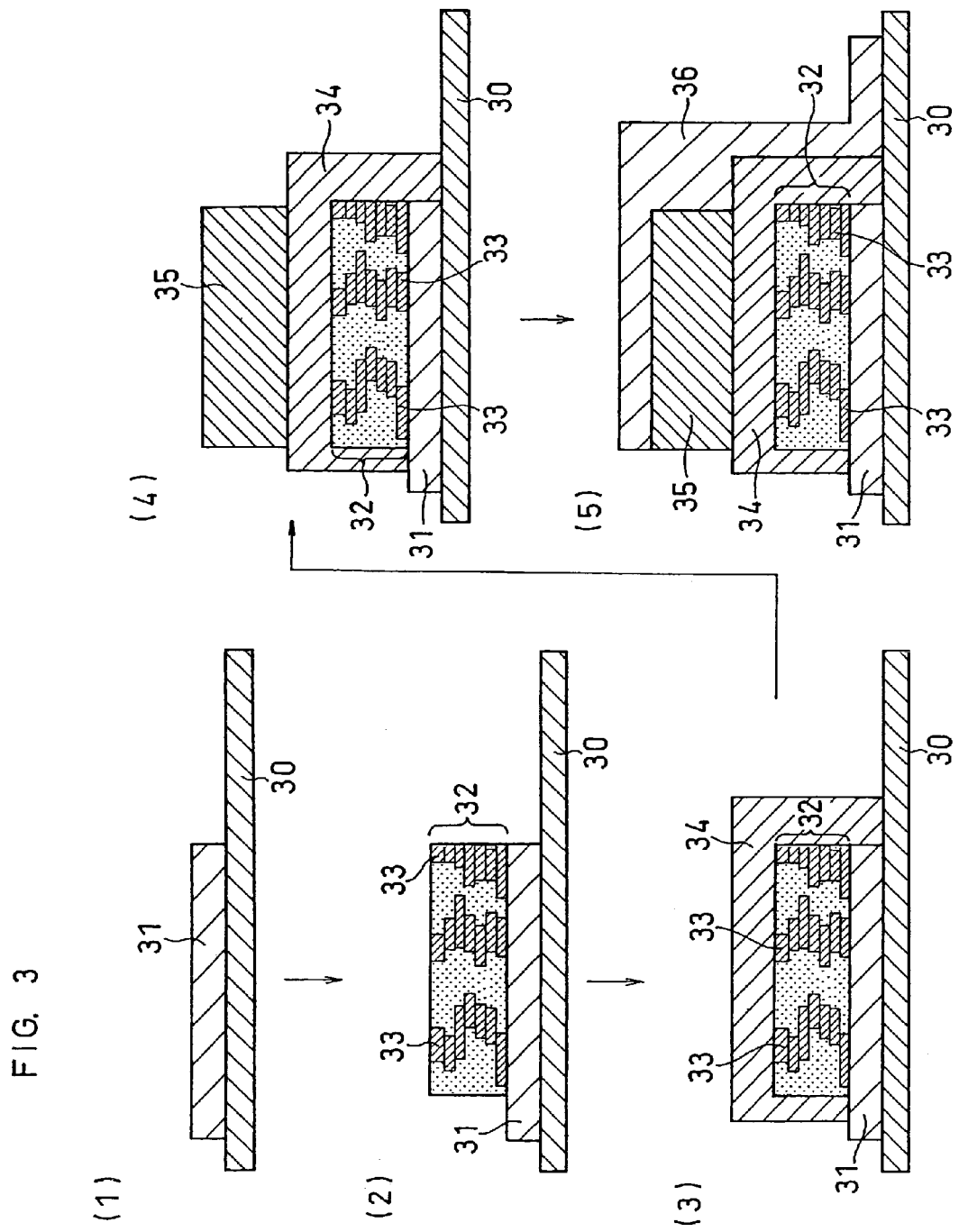
FIG. 3 is a sectional illustration showing the production procedure of a secondary battery of Example 1 in accordance with the present invention.

In order to evaluate a lithium secondary battery in accordance with the present invention, a test battery described in the following was produced. FIG. 3 shows the production procedure of the test battery of this example.

(i) First Step

After placing a metal mask having a window (20 mm×10 mm) over a mirror-finished silicon substrate 30 having an oxidized surface with a surface roughness of not more than 30 nm, a platinum current collector layer 31 having a thickness of 0.5 μm was produced by an rf magnetron sputter process (rf: Radio Frequency (high frequency)).

(ii) Second Step

After placing a metal mask having a window (10 mm×10 mm) over the platinum current collector layer 21(sic), lithium cobaltate and platinum were simultaneously sputtered (at a substrate temperature of 200° C.) by an rf magnetron sputter process employing two targets respectively comprising lithium cobaltate ($LiCoO_2$) and platinum, thereby producing a positive electrode layer 32 containing an electron conductive material (platinum) 33.

At this time, the composition ratio of lithium cobaltate and platinum was controlled by changing the respective rf power ratios such that the volume percentage of the platinum 33 in the positive electrode layer 32 was 2 vol %. The thickness of the positive electrode layer 32 was 4.1 μm.

(iii) Third Step

After placing a metal mask having a window (15 mm×15 mm) over the positive electrode layer 32, a solid electrolyte 34 having a thickness of 1 μm was produced by an rf magnetron sputter process employing lithium phosphate ($Li_3PO_4$) as a target.

(iv) Fourth Step

After placing a metal mask having a window (10 mm×10 mm) over the solid electrolyte layer 34, a negative electrode layer 35 comprising a lithium metal and having a thickness of 3.0 μm was produced by resistance heating vacuum vapor deposition so as not to spread out from the solid electrolyte layer 34.

(v) Fifth Step

After placing a metal mask having a window (10 mm×20 mm) over the negative electrode layer 35, a platinum current collector layer 36 having a thickness of 0.5 μm was produced by a sputter process (at a substrate temperature of room temperature) so as not to contact the platinum current collector layer 31.

EXAMPLES 2 TO 5 AND COMPARATIVE EXAMPLE 1

Batteries were produced in the same manner as in Example 1, except that in the second step, the rf power ratios in the rf magnetron sputter process were changed such that the volume percentages of platinum in the positive electrode layers were 5 vol % (Example 2), 25 vol % (Example 3), 50 vol % (Example 4) and 60 vol % (Example 5), respectively.

Additionally, a battery (Comparative Example 1) similar to that of Example 1 except for having a positive electrode layer comprising 100% lithium cobaltate and containing no platinum at all, was produced.

The thicknesses of the positive electrode layers of the batteries were 4.2 μm (Example 2), 5.3 μm (Example 3), 8.0 μm (Example 4), 10 μm (Example 5) and 4.0 μm (Comparative Example 1), respectively. The batteries of Examples 1 to 5 and Comparative Example 1 had the same capacity.

EXAMPLES 6 TO 10

Batteries were produced in the same manner as in Example 1, except that in the second step, lithium phosphate as an ion conductive material was employed in place of the electron conductive material (platinum) included in the positive electrode. More specifically, in the second step, a target comprising lithium phosphate was used in place of the target comprising platinum. Then, lithium phosphate was sputtered, simultaneously with lithium cobaltate, thereby producing a positive electrode layer containing the ion conductive material.

Additionally, the rf power ratios in the rf magnetron sputter process were changed such that the volume percentages of lithium phosphate in the positive electrode layers were 2 vol % (Example 6), 5 vol % (Example 7), 25 vol % (Example 8), 50 vol % (Example 9) and 60 vol % (Example 10), respectively.

The thicknesses of the positive electrode layers of the batteries were 4.1 μm (Example 6), 4.2 μm (Example 7), 5.3 μm (Example 8), 8.0 μm (Example 9) and 10 μm (Example 10), respectively. The batteries of Examples 6 to 10 had the same capacity as Comparative Example 1.

EXAMPLES 11 TO 15

Batteries were produced in the same manner as in Example 1, except that in the second step, both the electron conductive material (platinum) and the ion conductive material (lithium phosphate) were included in the positive electrode layer. More specifically, in the second step, a target comprising lithium cobaltate, a target comprising platinum and a target comprising lithium phosphate were used. Then, platinum and lithium phosphate were sputtered, simultaneously with lithium cobaltate, thereby producing a positive electrode layer containing the electron conductive material and the ion conductive material.

The rf power ratios in the rf magnetron sputter process were changed such that the total volume percentages of platinum and lithium phosphate in the positive electrode layers were 2 vol % (Example 11), 5 vol % (Example 12), 25 vol % (Example 13), 50 vol % (Example 14) and 60 vol % (Example 15), respectively. The volume ratio of platinum and lithium phosphate included in each of the positive electrode layers was 1:1.

The thicknesses of the positive electrode layers of the batteries were 4.1 μm (Example 11), 4.2 μm (Example 12), 5.3 μm (Example 13), 8.0 μm (Example 14) and 10 μm (Example 15), respectively. The batteries of Examples 11 to 15 had the same capacity as Comparative Example 1.

EXAMPLES 16 TO 20

Batteries were produced in the same manner as in Example 1, except that in the second step, lithium phosphate as an ion conductive material was employed in place of the electron conductive material (platinum) included in the positive electrode, and lithium cobaltate and lithium phosphate were alternately sputtered rather than that lithium phosphate was sputtered simultaneously with lithium cobaltate.

Herein, lithium cobaltate was sputtered at the beginning, and thereafter, lithium phosphate and lithium cobaltate were alternately sputtered, and lithium phosphate was sputtered at the end. In addition, the materials to be spattered were switched when the material being sputtered was deposited until the thickness thereof became 1% of that of the positive electrode layer.

Additionally, the rf power ratios in the rf magnetron sputter process were changed such that the volume percentages of lithium phosphate in the positive electrode layers were 2 vol % (Example 16), 5 vol % (Example 17), 25 vol % (Example 18), 50 vol % (Example 19) and 60 vol % (Example 20), respectively.

The thicknesses of the positive electrode layers of the batteries were 4.1 μm (Example 16), 4.2 μm (Example 17), 5.3 μm (Example 18), 8.0 μm (Example 19) and 10 μm (Example 20), respectively. The batteries of Examples 16 to 20 had the same capacity as Comparative Example 1.

Evaluation of Batteries of Examples 1 to 20 and Comparative Example 1

(a) Evaluation Method

The following charge/discharge test was performed on each battery.

The test was performed in a constant temperature bath at 20° C. placed in a room under a dry air atmosphere having a dew point temperature of −40° C.

Charging was performed in a current mode of 0.15 mA/cm$^2$ per electrode area, and discharging was performed in four different current modes of 0.15 mA/cm$^2$, 0.75 mA/cm$^2$, 1.50 mA/cm$^2$ and 7.50 mA/cm$^2$.

The charge and discharge end voltages were 4.2 V and 3.0 V, respectively.

(b) Evaluation Results

TABLE 1 shows the relation between the current mode and the discharge capacity when the positive electrode material and the electron conductive material were simultaneously sputtered. Each of the percentages shown herein is a relative value obtained when the discharge capacity of the battery of Comparative Example 1 at a current mode of 0.06 mA/cm$^2$ is taken as 100%.

TABLE 1

| Current mode | 0.15 mA/cm$^2$ | 0.75 mA/cm$^2$ | 1.50 mA/cm$^2$ | 7.50 mA/cm$^2$ |
|---|---|---|---|---|
| Com. Ex. 1 | 98% | 88% | 75% | 0% |
| Example 1 | 98% | 88% | 76% | 0% |
| Example 2 | 98% | 89% | 78% | 1% |
| Example 3 | 98% | 91% | 81% | 5% |
| Example 4 | 98% | 92% | 83% | 16% |
| Example 5 | 98% | 92% | 84% | 31% |

From TABLE 1, the discharge capacity was observed to slightly increase with an increase in the volume percentage of the electron conductive material (platinum) in the positive electrode layer. Particularly, a significant change was observed when the current mode was large: the discharge capacity was improved by including platinum in the positive electrode layer, as compared with that when no platinum was present at all. When the volume percentage of platinum was 2%, the discharge capacity was almost the same as that of Comparative Example 1. When the volume percentage of platinum was 50% or higher, no significant change was observed.

Next, TABLE 2 shows the relation between the current mode and the discharge capacity when the positive electrode material and the ion conductive material are simultaneously sputtered. Each of the percentages shown herein is a relative value obtained when the discharge capacity of the battery of Comparative Example 1 in a current mode of 0.06 mA/cm$^2$ is taken as 100%.

TABLE 2

| Current mode | 0.15 mA/cm$^2$ | 0.75 mA/cm$^2$ | 1.50 mA/cm$^2$ | 7.50 mA/cm$^2$ |
|---|---|---|---|---|
| Com. Ex. 1 | 98% | 88% | 75% | 0% |
| Example 6 | 98% | 91% | 82% | 11% |
| Example 7 | 99% | 93% | 86% | 31% |
| Example 8 | 99% | 95% | 90% | 52% |
| Example 9 | 99% | 96% | 92% | 59% |
| Example 10 | 99% | 96% | 93% | 63% |

As shown in TABLE 2, when the current mode was large, the discharge capacity rapidly increased with an increase in the volume percentage of the ion conductive material (lithium phosphate) in the positive electrode layer. Particularly, the discharge capacity was significantly improved when the volume percentage of lithium phosphate was 5%. Although a slight increase was also observed in the discharge capacity when the volume percentage of lithium phosphate was 2%, the effect was small. Additionally, no significant change was observed when the ion conductive material was 50 vol % or higher: the discharge capacity was almost unchanged when it was 60 vol %, as compared with when it was 50 vol %.

Next, TABLE 3 shows the relation between the current mode and the discharge capacity when the positive electrode material, the electron conductive material and the ion conductive material are simultaneously sputtered. Each of the percentages shown herein is a relative value obtained when the discharge capacity of the battery of Comparative Example 1 in a current mode of 0.06 mA/cm$^2$ is taken as 100%.

TABLE 3

| Current mode | 0.15 mA/cm$^2$ | 0.75 mA/cm$^2$ | 1.50 mA/cm$^2$ | 7.50 mA/cm$^2$ |
|---|---|---|---|---|
| Com. Ex. 1 | 98% | 88% | 75% | 0% |
| Example 11 | 98% | 91% | 82% | 8% |
| Example 12 | 99% | 92% | 84% | 21% |
| Example 13 | 99% | 94% | 88% | 40% |
| Example 14 | 99% | 95% | 90% | 52% |
| Example 15 | 99% | 96% | 91% | 56% |

As shown in TABLE 3, the discharge capacity was also observed to improve when both the electron conductive material (platinum) and the ion conductive material (lithium phosphate) were included in the positive electrode layer, as with the case where only the electron conductive material or ion conductive material was independently included. Particularly, the tendency of the discharge capacity increase was similar to that in the case where the ion conductive material was independently included: the discharge capacity in a current mode of 7.5 mA/cm$^2$ reached almost the maximum value when lithium phosphate was approximately 50 vol %. When lithium phosphate was 60 vol %, no significant change was observed, as compared with when it was 50 vol %. Although a slight increase was also observed in the discharge capacity when lithium phosphate was 2 vol %, the effect was small.

(iv) Results of Examples 16 to 20

TABLE 4 shows the relation between the current mode and the discharge capacity when the positive electrode material and the ion conductive material are alternately sputtered. Each of the percentages shown herein is a relative value obtained when the discharge capacity of the battery of Comparative Example 1 in a current mode of 0.06 mA/cm$^2$ is taken as 100%.

TABLE 4

| Current mode | 0.15 mA/cm$^2$ | 0.75 mA/cm$^2$ | 1.50 mA/cm$^2$ | 7.50 mA/cm$^2$ |
|---|---|---|---|---|
| Com. Ex. 1 | 98% | 88% | 75% | 0% |
| Example 16 | 98% | 91% | 82% | 11% |
| Example 17 | 99% | 93% | 86% | 31% |
| Example 18 | 99% | 95% | 90% | 52% |
| Example 19 | 99% | 96% | 92% | 59% |
| Example 20 | 99% | 96% | 93% | 63% |

As shown in TABLE 4, when lithium cobaltate and lithium phosphate were alternately sputtered, the results were substantially the same as those when lithium cobaltate and lithium phosphate were simultaneously sputtered.

Additionally, when lithium cobaltate and the electron conductive material are alternately sputtered, or when lithium cobaltate, the electron conductive material and the ion conductive material were alternately sputtered, the results were substantially the same as those when these were simultaneously sputtered.

Further, a sputter process was employed for producing the first electrode herein; however, it is also possible to employ a chemical gas phase reaction process, an ion beam vapor deposition process, an electron beam vapor deposition process, a resistance heating vapor deposition process, a laser ablation process or the like.

Further, the first electrode was used as the positive electrode layer herein; however, it is considered that a similar effect can also be achieved when the first electrode is used as a negative electrode layer.

Further, the ion conductive material and/or electron conductive material was included in the first electrode herein; however, it is considered that a similar effect can also be achieved when the ion conductive material and/or electron conductive material is included in the second electrode.

Further, an silicon substrate was used as the substrate, platinum as the first current collector and the second current collector, lithium cobaltate as the first electrode material, lithium phosphate as the solid electrolyte, and a lithium metal as the second electrode material herein; however, it is considered that a similar effect can also be achieved when materials other than these are used.

Further, the electrode material and the ion conductive material were alternately sputtered herein; however, it is considered that a similar effect can also be achieved when the electrode material and the electron conductive material are alternately sputtered, or when the electrode material, the ion conductive material and the electron conductive material are alternately sputtered.

EXAMPLE 21

A test battery described in the following was produced. The production procedure of the test battery of this example was the same as that shown in FIG. 3, except that the content of the second step was different.

(i) First Step

In the same manner as in Example 1, a platinum current collector layer having a thickness of 0.5 μm was produced on a mirror-finished silicon substrate having an oxidized surface with a surface roughness of not more than 30 nm by an rf magnetron sputter process.

(ii) Second Step

A positive electrode layer containing an electron conductive material (platinum) was produced in the same manner as in Example 1, except that a vacuum vapor deposition apparatus having two targets respectively comprising lithium cobaltate and platinum was used to simultaneously vapor-deposit lithium cobaltate and platinum (at a substrate temperature of 200° C.) on the platinum current collector layer by an electron beam vapor deposition process in place of the rf magnetron sputter process. At this time, the composition ratio of lithium cobaltate and platinum were controlled by regulating the respective vapor deposition rates such that the volume percentage of platinum in the positive electrode layer was 25 vol %. The thickness of this positive electrode layer was 5.3 μm.

(iii) Third Step

In the same manner as in Example 1, a solid electrolyte layer having a thickness of 1 gm was produced on the positive electrode layer by an rf magnetron sputter process employing lithium phosphate as a target.

(iv) Fourth Step

In the same manner as in Example 1, a negative electrode layer comprising a lithium metal and having a thickness of 3.0 μm was produced on the solid electrolyte layer by resistance heating vacuum vapor deposition.

(v) Fifth Step

In the same manner as in Example 1, a platinum current collector layer having a thickness of 0.5 μm was produced by a sputter process (at a substrate temperature of room temperature).

EXAMPLE 22

A battery was produced in the same manner as in Example 21, except that in the second step, lithium phosphate as an ion conductive material was employed in place of the electron conductive material (platinum) included in the positive electrode layer. More specifically, in the second step, a vacuum vapor deposition apparatus having two targets respectively comprising lithium cobaltate and lithium phosphate was used to simultaneously vapor-deposit (at a substrate temperature of 200° C.) on the platinum current collector, lithium cobaltate by an electron beam vapor deposition process, and lithium phosphate by a resistance heating vapor deposition process. In this manner, a positive electrode layer containing the ion conductive material (lithium phosphate) was produced.

In addition, the volume percentage of lithium phosphate in the positive electrode layer was adjusted to be 25 vol %. The thickness of this positive electrode layer was 5.3 μm.

EXAMPLE 23

A battery was produced in the same manner as in Example 21, except that in the second step, both the electron conductive material (platinum) and the ion conductive material (lithium phosphate) were included in the positive electrode layer. More specifically, in the second step, a vacuum vapor deposition apparatus having three targets respectively comprising lithium cobaltate, platinum and lithium phosphate was used to simultaneously vapor-deposit (at a substrate temperature of 200° C.) on the platinum current collector, lithium cobaltate and platinum by an electron beam vapor deposition process, and lithium phosphate by a resistance heating vapor deposition process. In this manner, a positive electrode layer containing both the electron conductive material (platinum) and the ion conductive material (lithium phosphate) was produced.

In addition, the total volume percentage of platinum and lithium phosphate in the positive electrode layer was adjusted to be 25 vol %. Further, the volume ratio of platinum and lithium phosphate in the positive electrode layer was 1:1. The thickness of this positive electrode layer was 5.3 μm.

COMPARATIVE EXAMPLE 2

A battery was produced in the same manner as in Example 21, except that in the second step, only lithium cobaltate was vapor-deposited on the platinum current collector by an electron beam vapor deposition process.

Evaluation of Batteries of Examples 21 to 23 and Comparative Example 2

(a) Evaluation Method

A charge/discharge test was performed on each battery in the same manner as in Examples 1 to 20. Herein, the battery of Comparative Example 2 had the same capacity as the batteries of Examples 21 to 23.

(b) Evaluation Results

TABLE 5 shows the relation between the current mode and the discharge capacity in the cases of the batteries of Examples 21 to 23 and Comparative Example 2. Each of the percentages shown herein is a relative value obtained when the discharge capacity of the battery of Comparative Example 2 in a current mode of 0.06 mA/cm$^2$ is taken as 100%.

TABLE 5

| Current mode | 0.15 mA/cm$^2$ | 0.75 mA/cm$^2$ | 1.50 mA/cm$^2$ | 7.50 mA/cm$^2$ |
|---|---|---|---|---|
| Com. Ex. 2 | 98% | 88% | 76% | 0% |
| Example 21 | 98% | 91% | 81% | 5% |
| Example 22 | 99% | 95% | 90% | 52% |
| Example 23 | 99% | 94% | 88% | 40% |

As shown in TABLE 5, even when the production method of the positive electrode layer was varied, the results were also substantially the same as those when an rf magnetron sputter process was used: the discharge capacity increased by including the electron conductive material and/or ion conductive material in the positive electrode layer.

Further, an electron beam vapor deposition process and a resistance heating vapor deposition process were used for producing the first electrode herein; however, it is also possible to employ a chemical gas phase reaction process, a sputter process, an ion beam vapor deposition process, a laser ablation process or the like.

Further, the first electrode was used as the positive electrode layer herein; however, it is considered that a similar effect can also be achieved when the first electrode is used as a negative electrode layer.

Further, the ion conductive material and/or electron conductive material was included in the first electrode herein; however, it is considered that a similar effect can also be achieved when the ion conductive material and/or electron conductive material is included in the second electrode.

In addition, a silicon substrate was used as the substrate, platinum as the first current collector and the second current collector, lithium cobaltate as the first electrode material, lithium phosphate as the solid electrolyte, a lithium metal as the second electrode material herein; however, it is considered that a similar effect can also be achieved when materials other than these are used.

Further, the electrode material and the ion conductive material and/or electron conductive material was simultaneously vapor-deposited herein; however, it is considered that a similar effect can also be achieved when these are alternately vapor-deposited.

EXAMPLE 24

Figure 4:
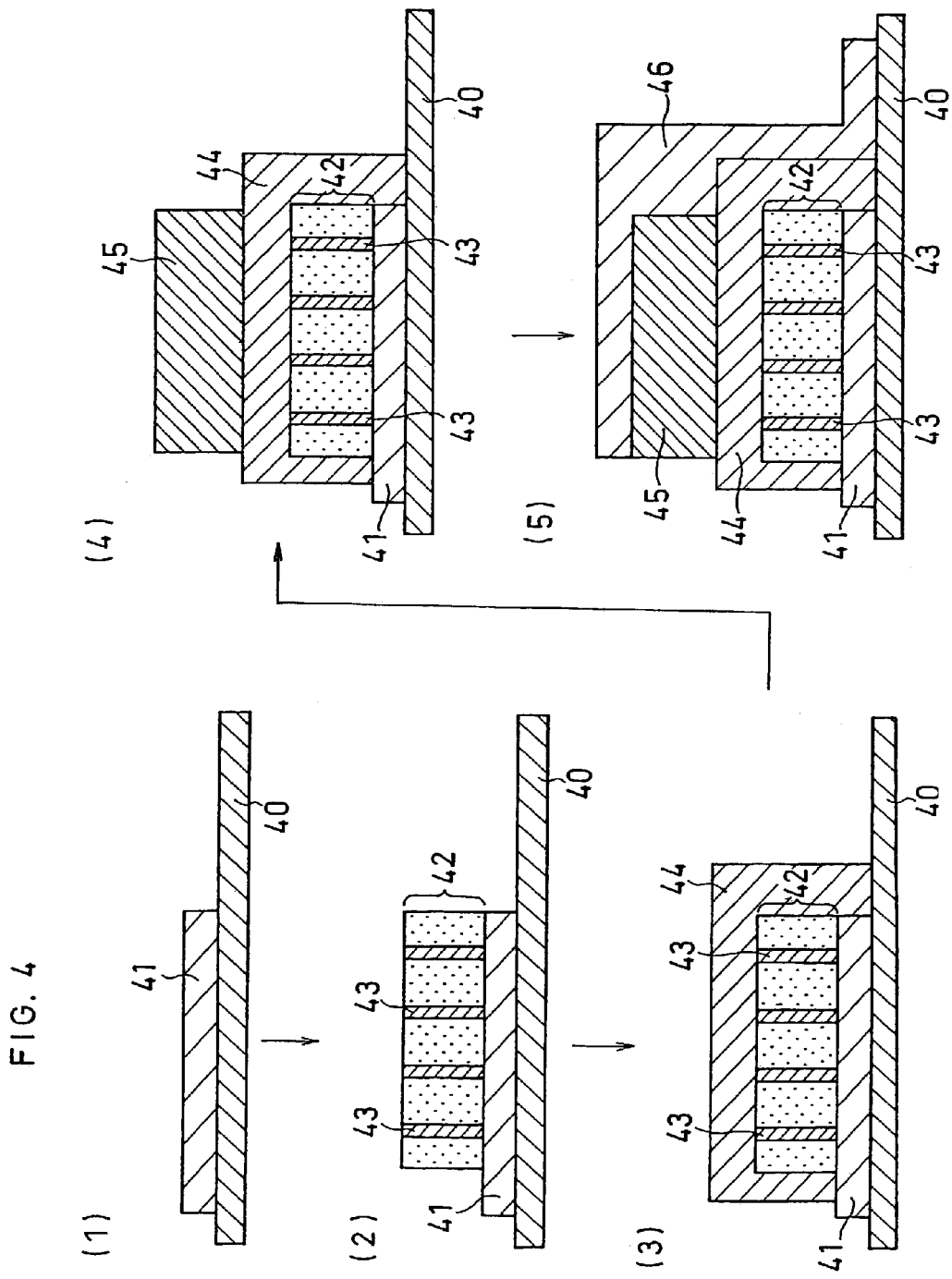
FIG. 4 is a sectional illustration showing the production procedure of a secondary battery of Example 24 in accordance with the present invention.

A test battery described in the following was produced. The production procedure of the test battery of this example was the same as that shown in FIG. 3, except that the content of the second step was different. FIG. 4 shows the production procedure of the test battery of this example.

(i) First Step

In the same manner as in Example 1, a platinum current collector layer 41 having a thickness of 0.5 μm was produced on a mirror-finished silicon substrate 40 having an oxidized surface with a surface roughness of not more than 30 nm by an rf magnetron sputter process (at a substrate temperature of room temperature, under ordinary conditions).

(ii) Second Step

After placing a metal mask having a window (10 mm×10 mm) over the platinum current collector layer 41, lithium cobaltate was sputtered (at a substrate temperature of 200° C.) by an rf magnetron sputter process employing a target comprising lithium cobaltate (LiCoO$_2$), thereby producing a positive electrode layer having no groove. The thickness of the positive electrode layer having no groove was 5.3 μm.

Next, grooves were formed on this positive electrode layer in the following manner.

Firstly, a photoresist film having a thickness of several micrometers was formed on the positive electrode layer. Herein, a plurality of grooves each having a width of 250 μm was formed at an interval of 750 μm on the photoresist film. Subsequently, an rf dry etching apparatus was used to etch lithium cobaltate located at parts of the positive electrode layer not coated with the photoresist film. Thereafter, the photoresist film was removed with a peeling solution to give a positive electrode layer having grooves. Herein, the grooves were formed by dry etching in this example; however, when any cracks are caused in the positive electrode layer 42, it is possible to utilize the cracks as the grooves.

Next, an rf magnetron sputter process employing platinum as a target was performed to fill an electron conductive material (platinum) 43 inside the grooves of the positive electrode layer.

After filling the electron conductive material 43 inside the grooves, a planarization treatment was performed on the surface of the positive electrode layer. Herein, an ultra-precision planarization CMP (chemical mechanical polishing) process was performed. The volume percentage of platinum in the thus produced positive electrode layer 42 containing the electron conductive material 43 was adjusted to be 25 vol %. The thickness of this positive electrode layer was 5.3 µm.

(iii) Third Step

In the same manner as in Example 1, a solid electrolyte layer 44 having a thickness of 1 µm was produced on the positive electrode layer 42 by an rf magnetron sputter process employing lithium phosphate as a target.

(iv) Fourth Step

In the same manner as in Example 1, a negative electrode layer 45 comprising a lithium metal and having a thickness of 3.0 µm was produced on the solid electrolyte layer 44 by resistance heating vacuum vapor deposition.

(v) Fifth Step

In the same manner as in Example 1, a platinum current collector layer 46 having a thickness of 0.5 µm was produced by a sputter process (at a substrate temperature of room temperature).

EXAMPLE 25

A battery was produced in the same manner as in Example 24, except that in the second step, lithium phosphate as an ion conductive material was employed in place of the electron conductive material (platinum) included in the positive electrode layer. More specifically, in the second step, lithium phosphate was filled inside the grooves by an rf magnetron sputter process employing a target comprising lithium phosphate. Then, after filling lithium phosphate inside the grooves, a planarization treatment was performed on the surface of the positive electrode layer in the same manner as in Example 24. The volume percentage of lithium phosphate in the positive electrode layer was adjusted to be 25 vol %. The thickness of this positive electrode layer was 5.3 µm.

EXAMPLE 26

A battery was produced in the same manner as in Example 24, except that in the second step, both the electron conductive material and the ion conductive material were included in the positive electrode layer. More specifically, in the second step, platinum and lithium phosphate were filled inside the grooves by an rf magnetron sputter process employing two targets respectively comprising platinum and lithium phosphate. Then, after filling platinum and lithium phosphate inside the grooves, a planarization treatment was performed on the surface of the positive electrode layer in the same manner as in Example 24. The total volume percentage of platinum and lithium phosphate in the positive electrode layer was adjusted to be 25 vol %. Additionally, the volume ratio of platinum and lithium phosphate was 1:1. The thickness of this positive electrode layer was 5.3 µm.

Evaluation of Batteries of Examples 24 to 26

(a) Evaluation Method

A charge/discharge test was performed on each battery in the same manner as in Examples 1 to 20. Herein, the batteries of Examples 24 to 26 had the same capacity as the battery of Comparative Example 1.

(b) Evaluation Results

TABLE 6 shows the relation between the current mode and the discharge capacity in the cases of the batteries of Examples 24 to 26 and Comparative Example 1. Each of the percentages shown herein is a relative value obtained when the discharge capacity of the battery of Comparative Example 1 in a current mode of 0.06 mA/cm$^2$ is taken as 100%.

TABLE 6

| Current mode | 0.15 mA/cm$^2$ | 0.75 mA/cm$^2$ | 1.50 mA/cm$^2$ | 7.50 mA/cm$^2$ |
| --- | --- | --- | --- | --- |
| Com. Ex. 1 | 98% | 88% | 75% | 0% |
| Example 24 | 98% | 91% | 81% | 5% |
| Example 25 | 99% | 95% | 90% | 52% |
| Example 26 | 99% | 94% | 88% | 40% |

As shown in TABLE 6, the discharge capacity was observed to increase in the cases of the batteries comprising an electrode having grooves, inside of which platinum and/or lithium phosphate was filled. Particularly, a significant change was observed when the current mode was large: a discharge capacity of 50% or more was obtained at 7.50 mA/cm$^2$ when lithium phosphate as an ion conductive material was included in the positive electrode layer.

Herein, a sputter process was used to fill the ion conductive material and/or electron conductive material inside the grooves formed on the first electrode; however, it is also possible to employ a chemical gas phase reaction process, an ion beam vapor deposition process, an electron beam vapor deposition process, a resistance heating vapor deposition process, a laser ablation process or the like.

Further, the first electrode was used as the positive electrode layer herein; however, it is considered that a similar effect can also be achieved when the first electrode is used as a negative electrode layer.

Further, the ion conductive material and/or electron conductive material was included in the first electrode herein; however, it is considered that a similar effect can also be achieved when the ion conductive material and/or electron conductive material is included in the second electrode.

Further, a CMP (chemical mechanical polishing) process was used as the planarization treatment on the surface of the electrode herein; however, it is also possible to employ other planarization treatments.

In addition, a silicon substrate was used as the substrate, platinum as the first current collector and the second current collector, lithium cobaltate as the first electrode material, lithium phosphate as the solid electrolyte, a lithium metal as the second electrode material herein; however, it is considered that a similar effect can also be achieved when materials other than these are used.

Further, the electrode material and the ion conductive material and/or electron conductive material were simultaneously sputtered herein; however, it is considered that a similar effect can also be achieved when these are alternately sputtered.

EXAMPLE 27

Figure 5:
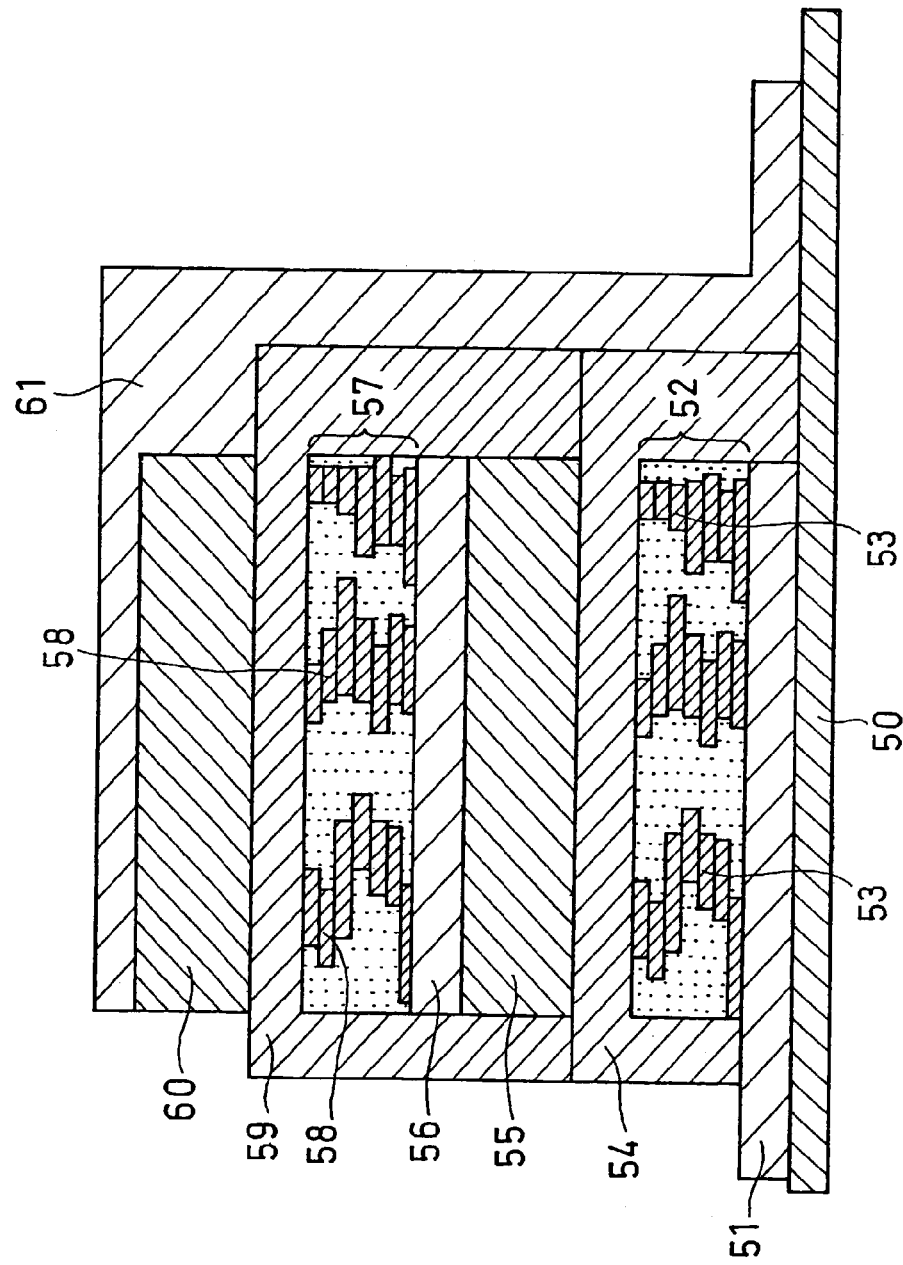
FIG. 5 is a vertical sectional view showing the configuration of a secondary battery of Example 27 in accordance with the present invention.
Figure 6:
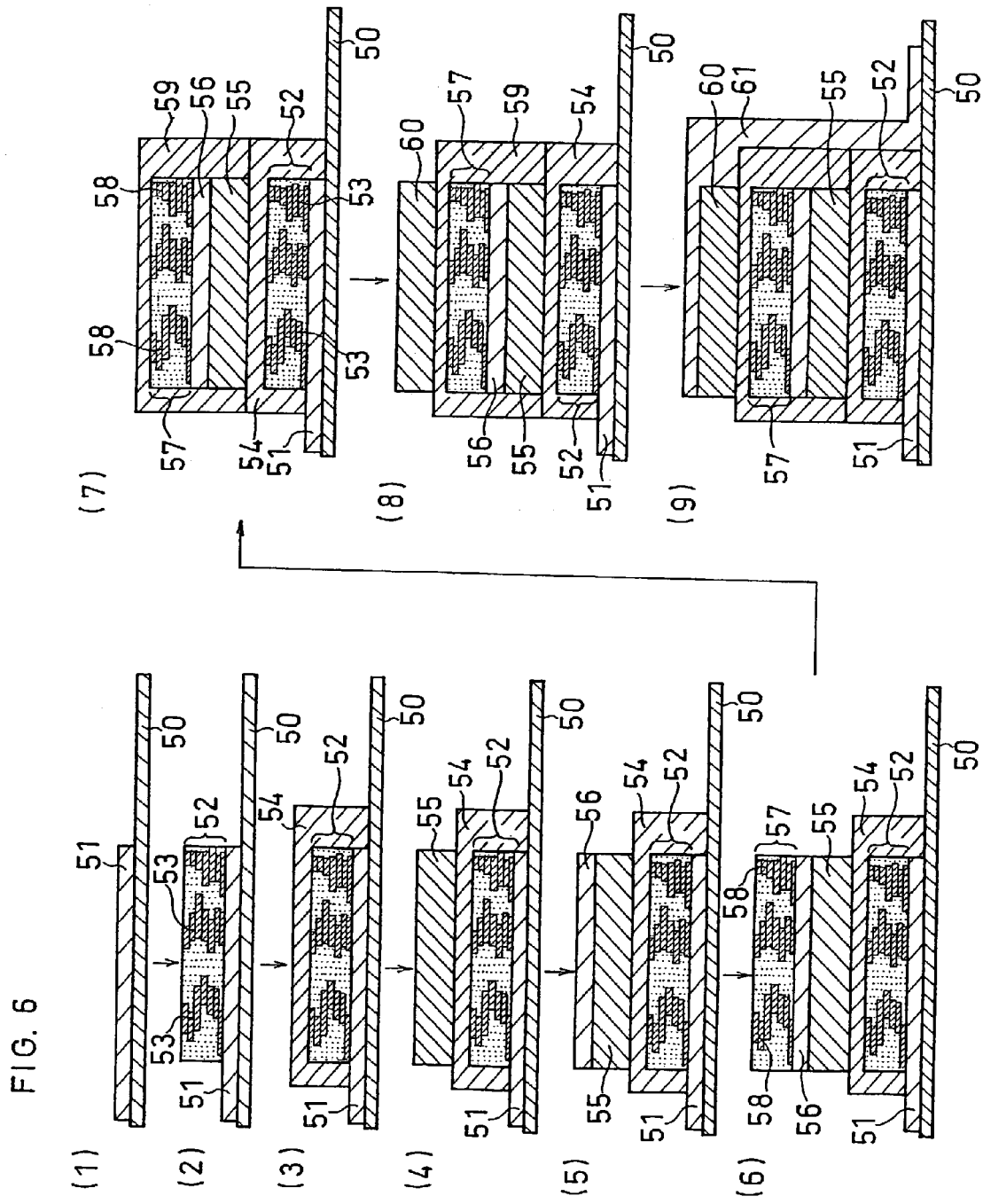
FIG. 6 is a sectional illustration showing the production procedure of a secondary battery of Example 27 in accordance with the present invention.

A test battery described in the following was produced. FIG. 5 shows the configuration of the test battery of this example. This battery was produced by stacking two pieces of the batteries of Example 8 in series. The production procedure of this battery is shown in FIG. 6.

(i) First Step

In the same manner as in Example 1, a platinum current collector layer 51 having a thickness of 0.5 µm was produced on a mirror-finished silicon substrate 50 having an oxidized surface with a surface roughness of not more than 30 nm by an rf magnetron sputter process (at a substrate temperature of room temperature, under ordinary conditions).

(ii) Second Step

In the same manner as in Example 8, lithium cobaltate and lithium phosphate were simultaneously sputtered (at a substrate temperature of 200° C.) on the platinum current collector layer 51, thereby producing a positive electrode layer 52 similar to that of Example 8, containing an ion conductive material (lithium phosphate) 53. That is, the rf power ratios were controlled such that the volume percentage of platinum in the positive electrode layer 52 was 25%. The thickness of this positive electrode layer was 5.3 µm.

(iii) Third Step

In the same manner as in Example 1, a solid electrolyte layer 54 having a thickness of 1 µm was produced on the positive electrode layer 42 by an rf magnetron sputter process employing lithium phosphate as a target.

(iv) Fourth Step

In the same manner as in Example 1, a negative electrode layer 55 comprising a lithium metal and having a thickness of 3.0 µm was produced on the solid electrolyte layer 54 by resistance heating vacuum vapor deposition.

(v) Fifth Step

In the same manner as in Example 1, a platinum current collector layer 56 having a thickness of 0.5 µm was produced by a sputter process (at a substrate temperature of room temperature).

(vi) Sixth Step

In the same manner as in the second step of this example, a positive electrode layer 57 containing an ion conductive material 58 in a volume percentage of 25% was produced on the platinum current collector layer 56.

(vii) Seventh Step

In the same manner as in the third step of this example, a solid electrolyte layer 59 comprising lithium phosphate was produced on the positive electrode layer 57.

(viii) Eighth Step

In the same manner as in the fourth step of this example, a negative electrode layer 60 comprising a lithium metal was produced on the solid electrolyte layer 59.

(ix) Ninth Step

In the same manner as in the fifth step of this example, a platinum current collector layer 61 having a thickness of 0.5 µm was produced, by a sputter process, so as not to contact the platinum current collector layers 51 and 56.

COMPARATIVE EXAMPLE 3

A battery was produced in the same manner as in Example 27, except that in the second step and the sixth step, only lithium cobaltate was vapor-deposited on the platinum current collectors by the rf magnetron sputter process. The positive electrode layers 52 and 57 of this battery contained no lithium phosphate at all, and the thickness of each of the positive electrode layers was 4.0 µm. The battery of Comparative Example 3 had the same capacity as the battery of Example 27.

Evaluation of Batteries of Example 27 and Comparative Example 3

(a) Evaluation Method

A charge/discharge test was performed on each test battery in the same manner as in Examples 1 to 20, except that the charge and discharge end voltages were 8.4 V and 6.0 V, respectively.

(b) Evaluation Results

TABLE 7 shows the relation between the current mode and the discharge capacity in the cases of the batteries of Example 27 and Comparative Example 3. Each of the percentages shown herein is a relative value obtained when the discharge capacity of the battery of Comparative Example 3 in a current mode of 0.06 mA/cm$^2$ is taken as 100%.

TABLE 7

| Current mode | 0.15 mA/cm$^2$ | 0.75 mA/cm$^2$ | 1.50 mA/cm$^2$ | 7.50 mA/cm$^2$ |
| --- | --- | --- | --- | --- |
| Com. Ex. 3 | 98% | 88% | 76% | 0% |
| Example 27 | 99% | 95% | 90% | 52% |

As shown in TABLE 6, even when two pieces of the batteries were stacked in series, the discharge capacity significantly improved as compared with Comparative Example 3, as in the case of Example 8.

Herein, a sputter process was used to produce the first electrode; however, it is also possible to employ a chemical gas phase reaction process, an ion beam vapor deposition process, an electron beam vapor deposition process, a resistance heating vapor deposition process, a laser ablation process or the like.

Further, the first electrode was used as the positive electrode layer herein; however, it is considered that a similar effect can also be achieved when the first electrode is used as a negative electrode layer.

Further, only the ion conductive material was included in the first electrode herein; however, it is considered that a similar effect can also be achieved when only the electron conductive material is independently included in the first electrode, or when the ion conductive material is included in the first electrode together with the electron conductive material, or when the ion conductive material and/or electron conductive material is included in the second electrode.

In addition, a silicon substrate was used as the substrate, platinum as the first current collector and the second current collector, lithium cobaltate as the first electrode material, lithium phosphate as the solid electrolyte, a lithium metal as the second electrode material herein; however, it is considered that a similar effect can also be achieved when materials other than these are used.

Further, the electrode material and the ion conductive material were simultaneously sputtered herein; however, it is considered that a similar effect can also be achieved when these are alternately sputtered.

Additionally, the volume percentage of lithium phosphate in the positive electrode layer was 25 vol % herein; however, it is possible to achieve the effect of the present invention when the volume percentage of lithium phosphate is, for example, not less than 5 vol % and not more than 50 vol %.

EXAMPLE 28

A test battery described in the following was produced.

The battery produced herein was essentially the same as the battery of Example 3. The positive electrode layer of this battery contained platinum in a volume percentage of 25%. Herein, lithium cobaltate and platinum were simultaneously sputtered by an rf magnetron sputter process, while paying attention such that platinum in the positive electrode layer serving as the first electrode contacted the platinum current collector layer serving as the first current collector, that is, such that platinum in the positive electrode layer extended in the thickness direction of the positive electrode layer to form an electron conducting path connected with the first current collector. The composition ratio of lithium cobaltate and platinum in the positive electrode layer was controlled by changing the respective rf power ratios. Additionally, the thickness of the positive electrode layer was 5.3 μm.

EXAMPLE 29

A test battery described in the following was produced.

The battery produced herein was essentially the same as the battery of Example 8. The positive electrode layer of this battery contained lithium phosphate in a volume percentage of 25%. Herein, attention was paid such that lithium phosphate in the positive electrode layer serving as the first electrode contacted the solid electrolyte layer. More specifically, lithium cobaltate and lithium phosphate were simultaneously sputtered by an rf magnetron sputter process, while paying attention such that lithium phosphate in the positive electrode layer extended in the thickness direction of the positive electrode layer to form an ion conducting path connected with the solid electrolyte layer. The composition ratio of lithium cobaltate and lithium phosphate in the positive electrode layer was controlled by changing the respective rf power ratios. Additionally, the thickness of the positive electrode layer was 5.3 μm.

EXAMPLE 30

A test battery described in the following was produced.

The battery produced herein was essentially the same as the battery of Example 13. The positive electrode layer of this battery contained platinum and lithium phosphate in a total volume percentage of 25%. Herein, attention was paid such that platinum in the positive electrode layer serving as the first electrode contacted the first current collector, and lithium phosphate in the positive electrode layer contacted the solid electrolyte layer. More specifically, lithium cobaltate, platinum and lithium phosphate were simultaneously sputtered by an rf magnetron sputter process, while paying attention such that platinum in the positive electrode layer extended in the thickness direction of the positive electrode layer to form an electron conducting path connected with the first current collector, and lithium phosphate in the positive electrode layer extended in the thickness direction of the positive electrode layer to form an ion conducting path connected with the solid electrolyte layer. The composition ratio of lithium cobaltate, platinum and lithium phosphate in the positive electrode layer was controlled by changing the respective rf power ratios. Additionally, the thickness of the positive electrode layer was 5.3 μm.

COMPARATIVE EXAMPLE 4

A battery having a positive electrode layer containing platinum in a volume percentage of 25% was produced in the same manner as in Example 28, except that in the production of the positive electrode layer, only lithium cobaltate was sputtered in the vicinity of the platinum current collector layer such that platinum in the positive electrode layer did not contact the platinum current collector layer serving as the first current collector. The thickness of the positive electrode layer was 5.3 μm.

COMPARATIVE EXAMPLE 5

A battery having a positive electrode layer containing lithium phosphate in a volume percentage of 25% was produced in the same manner as in Example 29, except that in the production of the positive electrode layer, only lithium cobaltate was sputtered in the vicinity of the solid electrolyte layer such that lithium phosphate in the positive electrode layer did not contact the solid electrolyte layer. The thickness of the positive electrode layer was 5.3 μm.

COMPARATIVE EXAMPLE 6

A battery having a positive electrode layer containing platinum and lithium phosphate in a total volume percentage of 25% was produced in the same manner as in Example 30, except that in the production of the positive electrode layer, only lithium cobaltate was sputtered in the vicinity of the platinum current collector layer such that platinum in the positive electrode layer did not contact the platinum current collector layer serving as the first current collector, and only lithium cobaltate was sputtered in the vicinity of the solid electrolyte layer such that lithium phosphate in the positive electrode layer did not contact the solid electrolyte layer. The thickness of the positive electrode layer was 5.3 μm.

Evaluation of Batteries of Examples 28 to 30 and Comparative Examples 4 to 6

(a) Evaluation Method

In the same manner as in Examples 1 to 20, a charge/discharge test was performed on each battery. Herein, the capacities of the batteries of Example 28, Example 29 and Example 30 were the same as those of the batteries of Comparative Example 4, Comparative Example 5 and Comparative Example 6, respectively.

(b) Evaluation Results

TABLE 8 shows the relation between the current mode and the discharge capacity in the cases of the batteries of Example 28 and Comparative Example 4. Each of the percentages shown herein is a relative value obtained when the discharge capacity of the battery of Comparative Example 4 in a current mode of 0.06 mA/cm$^2$ is taken as 100%.

TABLE 8

| Current mode | 0.15 mA/cm$^2$ | 0.75 mA/cm$^2$ | 1.50 mA/cm$^2$ | 7.50 mA/cm$^2$ |
|---|---|---|---|---|
| Com. Ex. 4 | 98% | 88% | 76% | 0% |
| Example 28 | 98% | 91% | 81% | 5% |

Next, TABLE 9 shows the relation between the current mode and the discharge capacity in the cases of the batteries of Example 29 and Comparative Example 5. Each of the percentages shown herein is a relative value obtained when the discharge capacity of the battery of Comparative Example 5 in a current mode of 0.06 mA/cm² is taken as 100%.

TABLE 9

| Current mode | 0.15 mA/cm² | 0.75 mA/cm² | 1.50 mA/cm² | 7.50 mA/cm² |
|---|---|---|---|---|
| Com. Ex. 5 | 98% | 91% | 82% | 11% |
| Example 29 | 99% | 95% | 90% | 52% |

Next, TABLE 10 shows the relation between the current mode and the discharge capacity in the cases of the batteries of Example 30 and Comparative Example 6. Each of the percentages shown herein is a relative value obtained when the discharge capacity of the battery of Comparative Example 6 in a current mode of 0.06 mA/cm² is taken as 100%.

TABLE 10

| Current mode | 0.15 mA/cm² | 0.75 mA/cm² | 1.50 mA/cm² | 7.50 mA/cm² |
|---|---|---|---|---|
| Com. Ex. 6 | 98% | 91% | 82% | 8% |
| Example 30 | 99% | 94% | 88% | 40% |

As shown in TABLEs 8 to 10, when the electron conductive material in the positive electrode layer extended in the thickness direction of the positive electrode layer to form the electron conducting path connected with the platinum current collector layer serving as the first current collector, and when the ion conductive material in the positive electrode layer extended in the thickness direction of the positive electrode layer to form the ion conducting path connected with the solid electrolyte layer, the discharge capacity was improved as compared with when such electron conducting path and/or electron conducting path was not formed.

Herein, a sputter process was employed to produce a first electrode; however, it is also possible to employ a chemical gas phase reaction process, an ion beam vapor deposition process, an electron beam vapor deposition process, a resistance heating vapor deposition process, a laser ablation process or the like.

Further, the first electrode was used as the positive electrode layer herein; however, it is considered that a similar effect can also be achieved when the first electrode is used as a negative electrode layer.

Further, the ion conductive material was included in the first electrode herein; however, it is considered that a similar effect can also be achieved when the electron conductive material is included in the first electrode, or when the ion conductive material and/or electron conductive material is included in the second electrode.

In addition, a silicon substrate was used as the substrate, platinum as the first current collector and the second current collector, lithium cobaltate as the first electrode material, lithium phosphate as the solid electrolyte, a lithium metal as the second electrode material herein; however, it is considered that a similar effect can also be achieved when materials other than these are used.

Additionally, the volume percentage of platinum and/or lithium phosphate in the positive electrode layer was 25 vol % herein; however, it is possible to achieve the effect of the present invention when the volume percentage of platinum and/or lithium phosphate is, for example, not less than 5 vol % and not more than 50 vol %.

EXAMPLE 31

Figure 7:
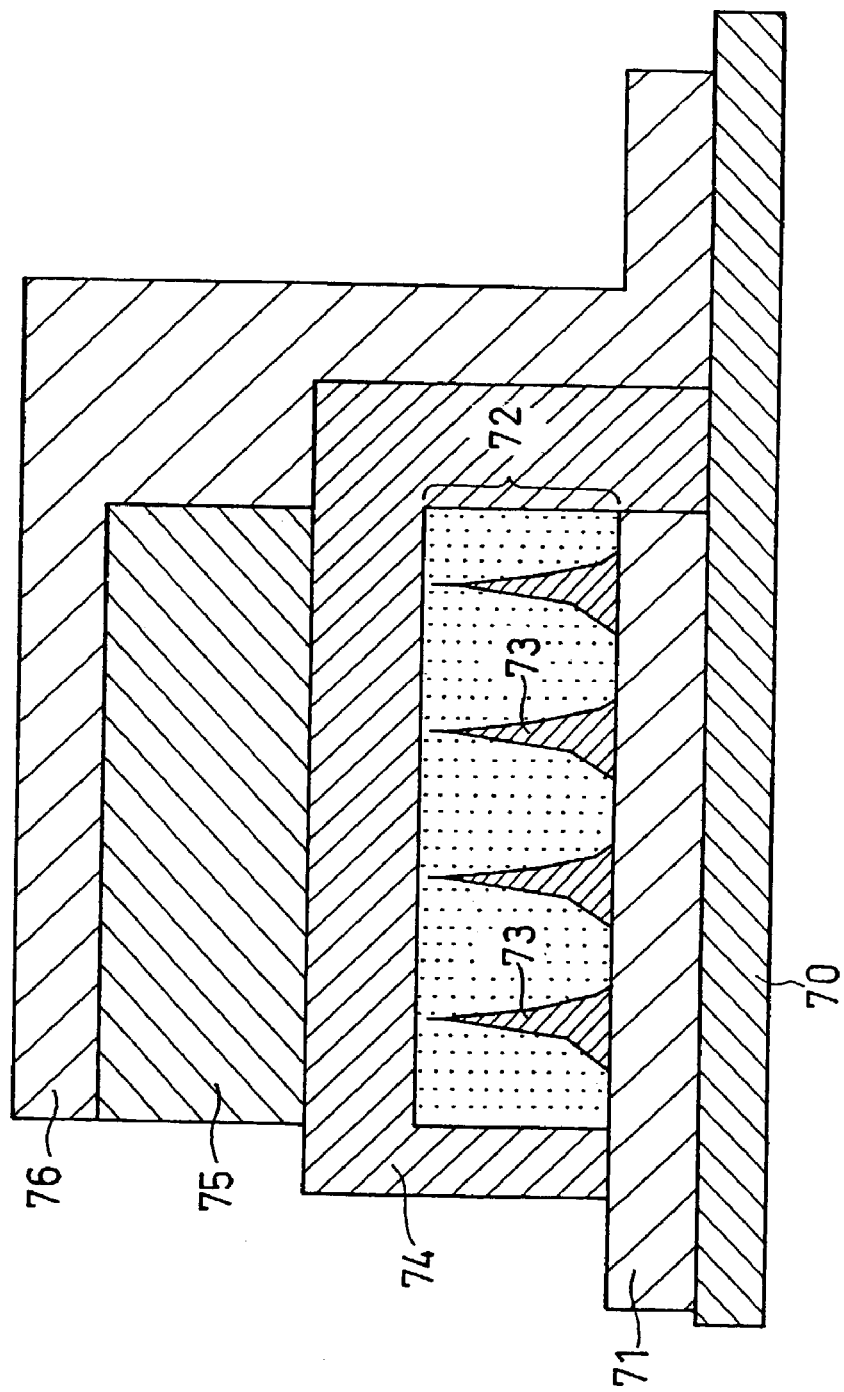
FIG. 7 is a vertical sectional view showing the configuration of a secondary battery of Example 31 in accordance with the present invention.

A test battery described in the following was produced.
FIG. 7 shows the configuration of a battery of this example.

(i) First Step
In the same manner as in Example 1, a platinum current collector layer 71 having a thickness of 0.5 μm was produced on a mirror-finished silicon substrate 70 having an oxidized surface with a surface roughness of not more than 30 nm by an rf magnetron sputter process.

(ii) Second Step
After placing a metal mask having a window (10 mm×10 mm) over the platinum current collector layer 71, lithium cobaltate and platinum were simultaneously sputtered (at a substrate temperature of 200° C.) by an rf magnetron sputter process employing two targets respectively comprising lithium cobaltate (LiCoO₂) and platinum, thereby producing a positive electrode layer 72 containing an electron conductive material (platinum) 73.

At this time, the volume ratio of lithium cobaltate and platinum simultaneously sputtered was varied with time such that the amount of the platinum 73 in the positive electrode layer decreased with an increase in the distance from the platinum current collector layer 71. Specifically, the same volumes of lithium cobaltate and platinum were sputtered at the beginning, and the ratio of platinum was gradually decreased such that only lithium cobaltate was sputtered at the end. The composition ratio of lithium cobaltate and platinum was controlled by changing the respective rf power ratios. Additionally, the volume percentage of the platinum 73 in the positive electrode layer 72 was adjusted to be 25%. The thickness of the positive electrode layer 72 was 5.3 μm.

(iii) Third Step
In the same manner as in Example 1, a solid electrolyte layer 74 having a thickness of 1 μm was produced on the positive electrode layer 72 by an rf magnetron sputter process employing lithium phosphate as a target.

(iv) Fourth Step
In the same manner as in Example 1, a negative electrode layer 75 comprising a lithium metal and having a thickness of 3.0 μm was produced on the solid electrolyte layer 74 by resistance heating vacuum vapor deposition.

(vi) Fifth Step
In the same manner as in Example 1, a platinum current collector layer 76 having a thickness of 0.5 μm was produced by a sputter process (at a substrate temperature of room temperature).

EXAMPLE 32

Figure 8:
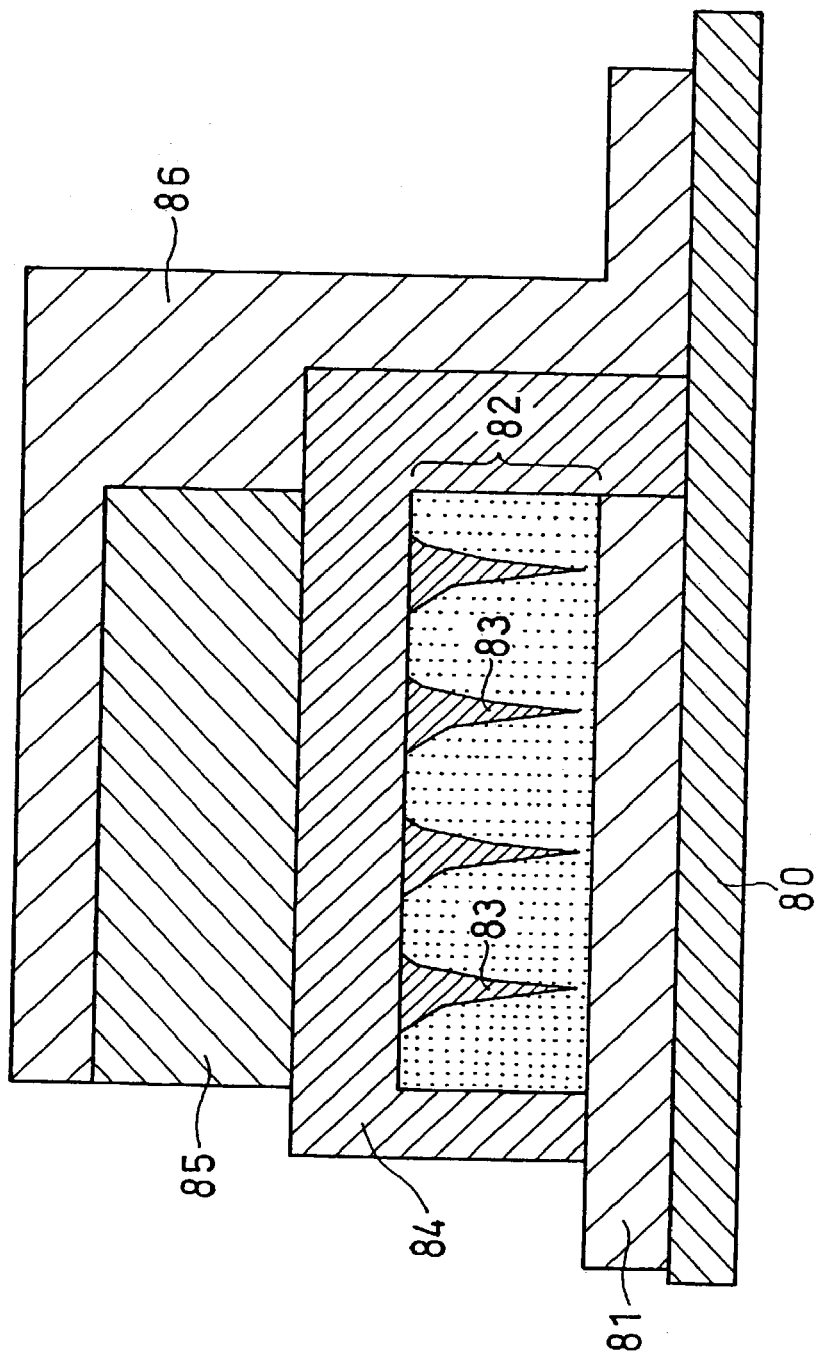
FIG. 8 is a vertical sectional view showing the configuration of a secondary battery of Example 32 in accordance with the present invention.

A test battery described in the following was produced.
FIG. 8 shows the configuration of a battery of this example.

(i) First Step
In the same manner as in Example 1, a platinum current collector layer 81 having a thickness of 0.5 μm was produced on a mirror-finished silicon substrate 80 having an oxidized surface with a surface roughness of not more than 30 nm by an rf magnetron sputter process.

(ii) Second Step

After placing a metal mask having a window (10 mm×10 mm) over the platinum current collector layer 81, lithium cobaltate and lithium phosphate were simultaneously sputtered (at a substrate temperature of 200° C.) by an rf magnetron sputter process employing two targets respectively comprising lithium cobaltate (LiCoO$_2$) and lithium phosphate, thereby producing a positive electrode layer 82 containing an ion conductive material (lithium phosphate) 83.

At this time, the volume ratio of lithium cobaltate and lithium phosphate was varied with time such that the amount of the lithium phosphate 83 in the positive electrode layer increased with an increase in the distance from the platinum current collector layer 81. Specifically, only lithium cobaltate was sputtered at the beginning, and the ratio of lithium phosphate was gradually increased such that the same volumes of lithium phosphate and lithium cobaltate were sputtered at the end. The composition ratio of lithium cobaltate and lithium phosphate was controlled by changing the respective rf power ratios. Additionally, the volume percentage of the lithium phosphate 83 in the positive electrode layer 82 was adjusted to be 25%. The thickness of the positive electrode layer 82 was 5.3 μm.

(iii) Third Step

In the same manner as in Example 1, a solid electrolyte layer 84 having a thickness of 1 μm was produced on the positive electrode layer 82 by an rf magnetron sputter process employing lithium phosphate as a target.

(iv) Fourth Step

In the same manner as in Example 1, a negative electrode layer 85 comprising a lithium metal and having a thickness of 3.0 μm was produced on the solid electrolyte layer 84 by resistance heating vacuum vapor deposition.

(v) Fifth Step

In the same manner as in Example 1, a platinum current collector layer 86 having a thickness of 0.5 μm was produced by a sputter process (at a substrate temperature of room temperature).

EXAMPLE 33

Figure 9:
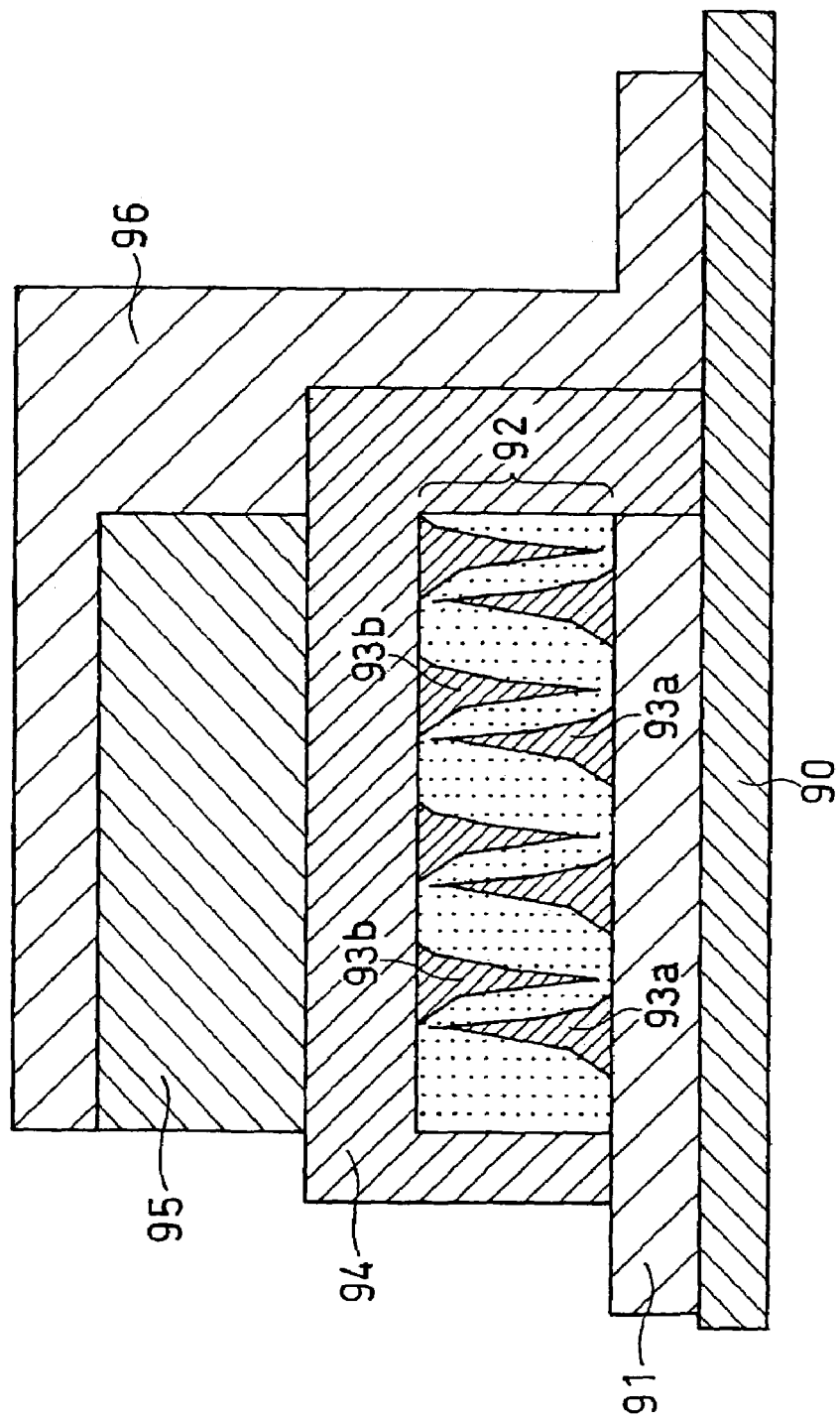
FIG. 9 is a vertical sectional view showing the configuration of a secondary battery of Example 33 in accordance with the present invention.

A test battery described in the following was produced.
FIG. 9 shows the configuration of a battery of this example.

(i) First Step

In the same manner as in Example 1, a platinum current collector layer 91 having a thickness of 0.5 μm was produced on a mirror-finished silicon substrate 90 having an oxidized surface with a surface roughness of not more than 30 nm by an rf magnetron sputter process.

(ii) Second Step

After placing a metal mask having a window (10 mm×10 mm) over the platinum current collector layer 91, lithium cobaltate, platinum and lithium phosphate were simultaneously sputtered (at a substrate temperature of 200° C.) by an rf magnetron sputter process employing three targets respectively comprising lithium cobaltate (LiCoO$_2$), platinum and lithium phosphate, thereby producing a positive electrode layer 92 containing an electron conductive material (platinum) 93a and an ion conductive material (lithium phosphate) 93b.

At this time, the volume ratio of lithium cobaltate, platinum and lithium phosphate simultaneously sputtered was varied with time such that the amount of the platinum 93a in the positive electrode layer decreased with an increase in the distance from the platinum current collector layer 91, and the amount of the lithium phosphate 93b in the positive electrode layer increased with an increase in the distance from the platinum current collector layer 91. Specifically, only lithium cobaltate and platinum were sputtered at a volume ratio of 3:1 at the beginning, and the ratio of platinum was gradually decreased, while increasing the ratio of lithium phosphate, such that only lithium cobaltate and lithium phosphate were sputtered at a volume ratio of 3:1 at the end. The composition ratio of lithium cobaltate, platinum and lithium phosphate was controlled by changing the respective rf power ratios. Additionally, the total volume percentage of the platinum 93a and the lithium phosphate 93b in the positive electrode layer 92 was adjusted to be 25%. The thickness of the positive electrode layer 92 was 5.3 μm.

(iii) Third Step

In the same manner as in Example 1, a solid electrolyte layer 94 having a thickness of 1 μm was produced on the positive electrode layer 92 by an rf magnetron sputter process employing lithium phosphate as a target.

(iv) Fourth Step

In the same manner as in Example 1, a negative electrode layer 95 comprising a lithium metal and having a thickness of 3.0 μm was produced on the solid electrolyte layer 94 by resistance heating vacuum vapor deposition.

(v) Fifth Step

In the same manner as in Example 1, a platinum current collector layer 96 having a thickness of 0.5 μm was produced by a sputter process (at a substrate temperature of room temperature).

Evaluation of Batteries of Examples 31 to 33

(a) Evaluation Method

In the same manner as in Examples 1 to 20, a charge/discharge test was performed on each battery. Herein, the capacities of the batteries of Examples 31, Example 32 and Example 33 were the same as those of the batteries of Example 3 (in which the positive electrode layer contained platinum in a volume percentage of 25%), Example 8 (in which the positive electrode layer contained lithium phosphate in a volume percentage of 25%) and Example 13 (in which the positive electrode layer contained platinum and lithium phosphate in a total volume percentage of 25%), respectively.

(b) Evaluation Results

TABLE 11 shows the relation between the current mode and the discharge capacity in the cases of the batteries of Example 31 and Example 3. Each of the percentages shown herein is a relative value obtained when the discharge capacity of the battery of Comparative Example 1 in a current mode of 0.06 mA/cm$^2$ is taken as 100%.

TABLE 11

| Current mode | 0.15 mA/cm$^2$ | 0.75 mA/cm$^2$ | 1.50 mA/cm$^2$ | 7.50 mA/cm$^2$ |
|---|---|---|---|---|
| Example 3 | 98% | 91% | 81% | 5% |
| Example 31 | 98% | 92% | 83% | 16% |

Next, TABLE 12 shows the relation between the current mode and the discharge capacity in the cases of the batteries of Example 32 and Example 8. Each of the percentages shown herein is a relative value obtained when the discharge capacity of the battery of Comparative Example 1 in a current mode of 0.06 mA/cm² is taken as 100%.

TABLE 12

| Current mode | 0.15 mA/cm² | 0.75 mA/cm² | 1.50 mA/cm² | 7.50 mA/cm² |
|---|---|---|---|---|
| Example 8 | 99% | 95% | 90% | 52% |
| Example 32 | 99% | 96% | 92% | 59% |

Next, TABLE 13 shows the relation between the current mode and the discharge capacity in the cases of the batteries of Example 33 and Example 13. Each of the percentages shown herein is a relative value obtained when the discharge capacity of the battery of Comparative Example 1 in a current mode of 0.06 mA/cm² is taken as 100%.

TABLE 13

| Current mode | 0.15 mA/cm² | 0.75 mA/cm² | 1.50 mA/cm² | 7.50 mA/cm² |
|---|---|---|---|---|
| Example 13 | 99% | 94% | 88% | 40% |
| Example 33 | 99% | 95% | 90% | 48% |

As shown in TABLEs 11 to 13, when the amount of platinum forming the electron conducting path decreased from the first current collector side toward the other side, and when the amount of lithium phosphate forming the ion conducting path decreased from the solid electrolyte layer side toward the other side, the discharge capacity was improved as compared with when there was no such gradient.

Further, a sputter process was used to produce the first electrode herein; however, it is also possible to employ a chemical gas phase reaction process, an ion beam vapor deposition process, an electron beam vapor deposition process, a resistance heating vapor deposition process, a laser ablation process or the like.

Further, the first electrode was used as the positive electrode layer herein; however, it is considered that a similar effect can also be achieved when the first electrode is used as a negative electrode layer.

Further, the ion conductive material was included in the first electrode herein; however, it is considered that a similar effect can also be achieved when the electron conductive material is included in the first electrode, or when the ion conductive material and/or electron conductive material is included in the second electrode.

In addition, a silicon substrate was used as the substrate, platinum as the first current collector and the second current collector, lithium cobaltate as the first electrode material, lithium phosphate as the solid electrolyte, and a lithium metal as the second electrode material herein; however, it is considered that a similar effect can also be achieved when materials other than these are used.

Additionally, the volume percentage of platinum and/or lithium phosphate in the positive electrode layer was 25 vol % herein; however, it is possible to achieve the effect of the present invention when the volume percentage of platinum and/or lithium phosphate is, for example, not less than 5 vol % and not more than 50 vol %.

Additionally, the gradient of the amount of platinum and/or lithium phosphate in the positive electrode layer was represented by Formulas 1 to 4 herein; however, it is also possible to employ other formula or gradient state.

INDUSTRIAL APPLICABILITY

According to the present invention, since a first electrode and/or second electrode in a secondary battery, particularly, an all solid-state thin film lithium secondary battery, comprises an ion conductive material and/or electron conductive material in addition to an electrode material, it is possible to increase the thickness of the thin film electrode without reducing the charge/discharge characteristic, thereby significantly increasing the battery capacity.

The invention claimed is:

1. A secondary battery comprising: a substrate; a first current collector; a first electrode; a solid electrolyte; a second electrode; and a second current collector;
    said first current collector being formed on said substrate and serving as a current collector of said first electrode,
    said first electrode being formed on said first current collector,
    said solid electrolyte being formed on said first electrode,
    said second electrode being formed on said solid electrolyte,
    said second culTent collector being formed on said second electrode and serving as a current collector of said second electrode,
    at least one of said first and second electrodes containing an electrode material and at least one conductive material which is different from said electrode material, said different conductive material comprising at least one of an ion conductive material and an electron conductive material,
    wherein said at least one electrode contains at least said ion conductive material, said ion conductive material extending in a thickness direction of said electrode to form at least one ion conducting path connected with said solid electrolyte, and
    wherein the amount of said ion conductive material forming said ion conducting path decreases from the current collector side to the solid electrolyte side.

2. The secondary battery in accordance with claim 1, wherein the volume percentage of said different conductive material in said at least one electrode is not less than 5 vol % and not more than 50 vol %.

3. The secondary battery in accordance with claim 1, wherein said at least one electrode has at least one groove formed along at least one of contact surfaces between said electrode and the current collector thereof and contact surfaces between said electrode and said solid electrolyte, said at least one different conductive material being filled inside said groove.

4. The secondary battery in accordance with claim 1, wherein said secondary battery is an all solid-state thin film lithium secondary battery.

5. The secondary battery in accordance with claim 1, wherein said electron conductive material is the same as a material of said first or second current collector.

6. The secondary battery in accordance with claim 1, wherein said ion conductive material is the same as a material of said solid electrolyte.

7. The secondary battery in accordance with claim 1, wherein said electron conductive material is selected from the group consisting of platinum, platinum/palladium, gold, silver, aluminum, copper, indium-tin-oxide film, and carbon materials.

8. The secondary battery in accordance with claim 1, wherein the ion conductive material is selected from the group consisting of lithium phosphate, Li $PO_{4-x}N_x$, lithium ion conductive sulfides, doped lithium ion conductive solid electrolytes, and oxyacid salts of lithium.

9. A secondary battery comprising: a substrate; a first current collector; a first electrode; a solid electrolyte; a second electrode; and a second current collector;
said first current collector being formed on said substrate and serving as a current collector of said first electrode,
said first electrode being formed on said first current collector,
said solid electrolyte being formed on said first electrode,
said second electrode being formed on said solid electrolyte,
said second current collector being formed on said second electrode and serving as a current collector of said second electrode,
at least one of said first and second electrodes containing an electrode material and at least one conductive material which is different from said electrode material, said different conductive material comprising at least one of an ion conductive material and an electron conductive material,
wherein said at least one electrode contains at least said electron conductive material, said electron conductive material extending in a thickness direction of said electrode to form at least one electron conducting path connected with the current collector thereof, and
wherein the amount of said electron conductive material forming said electron conducting path decreases from the current collector side to the solid electrolyte side.

10. The secondary battery in accordance with claim 9, wherein the volume percentage of said different conductive material in said at least one electrode is not less than 5 vol % and not more than 50 vol %.

11. The secondary battery in accordance with claim 9, wherein said at least one electrode has at least one groove formed along at least one of contact surfaces between said electrode and the current collector thereof and contact surfaces between said electrode and said solid electrolyte, said at least one different conductive material being filled inside said groove.

12. The secondary battery in accordance with claim 9, wherein said secondary battery is an all solid-state thin film lithium secondary battery.

13. The secondary battery in accordance with claim 9, wherein said electron conductive material is the same as a material of said first or second current collector.

14. The secondary battery in accordance with claim 9, wherein said ion conductive material is the same as a material of said solid electrolyte.

15. The secondary battery in accordance with claim 9, wherein said electron conductive material is selected from the group consisting of platinum, platinum/palladium, gold, silver, aluminum, copper, indium-tin-oxide film, and carbon materials.

16. The secondary battery in accordance with claim 9, wherein the ion conductive material is selected from the group consisting of lithium phosphate, Li $PO_{4-x}N_x$, lithium ion conductive sulfides, doped lithium ion conductive solid electrolytes, and oxyacid salts of lithium.

* * * * *

UNITED STATES PATENT AND TRADEMARK OFFICE
CERTIFICATE OF CORRECTION

| | | |
|---|---|---|
| PATENT NO. | : 7,094,500 B2 | Page 1 of 1 |
| APPLICATION NO. | : 10/333288 | |
| DATED | : August 22, 2006 | |
| INVENTOR(S) | : Masaya Ugaji et al. | |

It is certified that error appears in the above-identified patent and that said Letters Patent is hereby corrected as shown below:

Column 30, line 25:

Replace "culTent" with -- current --.

Signed and Sealed this

Twentieth Day of March, 2007

JON W. DUDAS
*Director of the United States Patent and Trademark Office*